US010122450B2

(12) United States Patent
Videv et al.

(10) Patent No.: US 10,122,450 B2
(45) Date of Patent: Nov. 6, 2018

(54) SYSTEM AND METHOD FOR COMMUNICATION BETWEEN TRANSMITTERS AND RECEIVERS HAVING AN ANGULAR DEPENDENCE

(71) Applicant: The University Court of the University of Edinburgh, Edinburgh (GB)

(72) Inventors: Stefan I. Videv, Edinburgh (GB); Dobroslav Tsonev, Edinburgh (GB); Harald Haas, Edinburgh (GB)

(73) Assignee: THE UNIVERSITY COURT OF THE UNIVERSITY OF EDINBURGH, Edinburgh (GB)

( * ) Notice: Subject to any disclaimer, the term of this patent is extended or adjusted under 35 U.S.C. 154(b) by 175 days.

(21) Appl. No.: 15/101,358

(22) PCT Filed: Dec. 2, 2014

(86) PCT No.: PCT/GB2014/053587
§ 371 (c)(1),
(2) Date: Jun. 2, 2016

(87) PCT Pub. No.: WO2015/082914
PCT Pub. Date: Jun. 11, 2015

(65) Prior Publication Data
US 2016/0308615 A1    Oct. 20, 2016

(30) Foreign Application Priority Data
Dec. 2, 2013  (GB) .................................. 1321260.0

(51) Int. Cl.
*H04B 10/00* (2013.01)
*H04B 10/116* (2013.01)
(Continued)

(52) U.S. Cl.
CPC ......... *H04B 10/116* (2013.01); *H04B 7/0413* (2013.01); *H04B 10/1129* (2013.01);
(Continued)

(58) Field of Classification Search
CPC .......................... H04B 10/116; H04B 7/0413; H04B 10/1129; H04B 10/1149; H04B 10/502; H04L 5/0025
See application file for complete search history.

(56) References Cited

U.S. PATENT DOCUMENTS 6,795,655 B1   9/2004  Sidorovich et al.
2012/0076509 A1   3/2012  Gurovich et al.
(Continued)

FOREIGN PATENT DOCUMENTS

EP   1079550 A1   2/2001

OTHER PUBLICATIONS

Joseph M. Kahn et al., "Wireless Infrared Communication," IEEE, 1997, pp. 265-298.*
(Continued)

*Primary Examiner* — Tesfaldet Bocure
(74) *Attorney, Agent, or Firm* — Alston & Bird LLP

(57) ABSTRACT

A communications system having at least one transmitter and at least one receiver, wherein the transmitters and/or receivers have an angular dependence, such that at least one response of the receivers to a received signal and/or at least one property of the signals transmitted by the transmitters is angularly dependent; the receiver and transmitter and/or the signals transmitted by the transmitters of two or more transmitter-receiver pairs have a distinct associated angular arrangement or relationship, wherein the at least one angularly dependent response of the receivers to the signal and/or the at least one angularly dependent property of the signal is dependent on the angular arrangement or relationship; and
(Continued)

the system is configured to use the angularly dependent property and/or response to identify or discriminate the transmitter from which the signal was transmitted and/or at least one communication channel associated therewith.

62 Claims, 11 Drawing Sheets

(51) Int. Cl.
| | | |
|---|---|---|
| *H04B 10/112* | (2013.01) | |
| *H04B 10/114* | (2013.01) | |
| *H04L 5/00* | (2006.01) | |
| *H04B 7/0413* | (2017.01) | |
| *H04B 10/50* | (2013.01) | |

(52) U.S. Cl.
CPC ....... *H04B 10/1149* (2013.01); *H04B 10/502* (2013.01); *H04L 5/0025* (2013.01)

(56) References Cited

U.S. PATENT DOCUMENTS

2015/0037042 A1* 2/2015 Gurovich ............. H04B 10/116
398/118
2015/0133173 A1* 5/2015 Edge ........................ G01S 1/66
455/456.6

OTHER PUBLICATIONS

Pouyan Djahani et al., "Analysis of Infrared Wireless Links Employing Multibeam Transmitters and Imaging Diversity Receivers," IEEE, 2000, pp. 2077-2088.*

Chen, Runhua, et al., "Multiuser Space-Time Block Coded MIMO System with Downlink Precoding", *Proceedings of 2004 IEEE International Conference on Communications*, Jun. 20-24, 2004, pp. 2689-2693, vol. 5, IEEE, U.S.A.

International Searching Authority, International Search Report and Written Opinion for International Application No. PCT/GB2014/053587, dated May 8, 2015, 11 pages, European Patent Office, The Netherlands.

Niu, Binglai, et al: "Downlink Scheduling with Transmission Strategy Selection for Multi-Cell MIMO Systems", IEEE Transactions on Wireless Communications, Feb. 2013, pp. 736-747, vol. 12, No. 2, IEEE, U.S.A.

Sadeghzadeh, Mehdi, et al, "Clustered Linear Precoding for Downlink Network MIMO Systems With Partial CSI", 2013 International Conference on Computing, Networking and Communications Signal Processing for Communications Symposium, Jan. 28, 2013, pp. 479-483, IEEE, U.S.A.

Skopljak, Alma, "The SDMA Re-Use Functionality in WCDMA Network", 50th International Symposium ELMAR 2008, Sep. 10-12, 2008, pp. 191-194, IEEE, U.S.A.

* cited by examiner

Traditional cell      Double-source cell (a)            (b)

SYSTEM AND METHOD FOR COMMUNICATION BETWEEN TRANSMITTERS AND RECEIVERS HAVING AN ANGULAR DEPENDENCE

CROSS REFERENCE TO RELATED APPLICATIONS

This application is a National Stage Application, filed under 35 U.S.C. § 371, of International Application No. PCT/GB2014/053587, filed Dec. 2, 2014, which claims priority to United Kingdom Application No. 1321260.0, filed Dec. 2, 2013; the contents of both of which are hereby incorporated by reference in their entirety.

BACKGROUND

Related Field

The present invention relates to transmitter and receivers geometries and associated communications systems and methods, particularly but not exclusively for use in multiple-input multiple-output optical communications systems.

Description of Related Art

Visible light communication (VLC) is being contemplated as a method of transmitting high data rates to mobile devices. VLC can also replace point-to-point infrastructure in places where conventional infrastructure does not exist or is too expensive to build. This technique could overcome the soon to be reached limitations in the availability of sufficient capacity in the radio spectrum to fulfil the growing demand. One of the protocols for VLC takes advantage of multiple transmitters and receivers in a so called multiple-input multiple-output (MIMO) arrangement, and separates the transmitted channels in space.

In MIMO systems commonly used in optical communications, each transmitter-receiver couple should form a distinct communication channel. In this way, it is possible for the system to distinguish between different simultaneously transmitted data streams.

It can be more difficult to achieve this requirement in optical communications systems, such as VLC systems, than in traditional radio frequency based systems, since the variability of the channel in optical communications systems is a lot less than for radio frequency based systems. In addition, since light beams become more parallel as the separation between the transmitter and receiver increases, the channel conditions become more similar at greater transmitter-receiver separations.

One option for overcoming this problem is to increase the separation of different transmitters and/or different receivers. However, this approach can lead to increases in the size of the transmitter and/or receiver systems, which may be undesirable.

BRIEF SUMMARY

Various aspects of the present invention are defined in the independent claims. Some preferred features are defined in the dependent claims.

According to a first aspect of the present invention is a communications system. The communications system may comprise at least one transmitter for transmitting one or more signals. The communications system may comprise at least one receiver for receiving the one or more signals. The transmitters and/or receivers may have an angular dependence, such that at least one response of the receivers to a received signal and/or at least one property of the signal(s) transmitted by the transmitter is angularly dependent. For example, a response of the receiver may be dependent on the angle at which the signal is received, e.g. relative to an optimum receiving axis of the receiver. At least one property of the signal(s) transmitted by the transmitter(s) and/or received by the receiver(s) may be angularly dependent, e.g. the at least one property may vary depending on an angle at which the signal is received and/or the angle at which the property of the signal is measured relative to a transmission axis of the signal or the transmitter.

The angularly dependent response or property may comprise, for example, power, intensity, received power or intensity, and/or the like. The angularly dependent response may comprise a normalised response, such as normalised received power.

It will be appreciated that the transmitter and/or the signals transmitted by the transmitter and receiver in each transmitter-receiver pair may have a given, predetermined or selectable angular arrangement or relationship. At least two transmitter-receiver pairs, and preferably each transmitter-receiver pair, may have or comprise a distinct or unique angular arrangement or relationship. For example, at least one and preferably each transmitter-receiver pair may comprise a different angular arrangement or relationship to at least one, and preferably each, other transmitter-receiver pair.

The system may be configured to determine the at least one angularly dependent property and/or response or a variation therein. The system may be configured to use the determined angularly dependant property and/or response to identify or distinguish the transmitter from which the signal was transmitted and/or to distinguish between communications channels or signals and/or to decode data encoded by position or selection of transmitters (e.g. using position encoding).

For example, it will be appreciated that the angularly dependent property or response may depend on the angular arrangement or relationship of the receiver and transmitter and/or signal transmitted by the transmitter in a given transmitter receiver pair. As such, since the receiver and transmitter and/or signal transmitted by the transmitter in each transmitter-receiver pair has a distinct or unique angular relationship, then a determination of the angularly dependent property or response can be used to identify the transmitter used to transmit the signal. In this way, the ability of the system to differentiate between communication channels associated with different transmitters or transmitter-receiver pairs may be improved.

A transmitter-receiver pair may comprise one of the transmitters and one of the receivers that can receive a signal emitted from the transmitter. It will be appreciated that each transmitter and/or each receiver may be comprised in one, two or more transmitter-receiver pairs.

At least one, and optionally each, of the receivers may have an associated optimal receiving axis. The response generated by the receiver for a given received signal may vary depending on the angle at which the signal was received, e.g. the response of the receiver may vary angularly. The optimal receiving axis may be a signal or beam path or axis for which the response generated by the receiver for a given signal is the highest. The response generated by the receiver to a signal received along a signal or beam axis or path that is angled to the optimal receiving axis of the receiver may be lower than the response that would be generated by the receiver if the signal or beam was provided along its optimal receiving axis. The response generated by the receiver for a signal received along a signal or beam axis or path may be inverse to the angle between the signal or beam axis or path and the associated optimal receiving axis.

At least one, and optionally each, transmitter or signal may have an associated transmission axis. The transmission axis may be an axis along which the signal power or intensity is the highest. The signal emitted by the transmitter(s) may vary angularly, e.g. the power or intensity of the signal along an axis that is rotated around the transmitter from the transmission axis may be lower than the power or intensity along the transmission axis.

The distinct or unique angular arrangement or relationship may comprise an unique or distinct angle at which the receiver is oriented or located relative to the transmission axis of the signal or transmitter and/or an angle or orientation of the transmitter and/or receiver and/or a relative angle or orientation of the transmitter and receiver.

The distinct or unique angular arrangement or relationship may be or comprise a distinct or unique angle between a path or axis along which signal(s) from the transmitter are received at the receiver and an optimum receiving axis of the receiver.

The distinct or unique angular arrangement or relationship may comprise an angle or orientation of a transmission axis of the signal or transmitter and/or an angle or orientation of the optimum receiving axis of the receiver and/or a relative angle or orientation of the transmission axis of the signal or transmitter and the optimum receiving axis of the receiver.

At least one, and optionally each, transmitter may be angled or oriented differently or obliquely to at least one, and optionally each, other transmitter.

At least one, and optionally each, receiver may be angled or oriented differently or obliquely to at least one, and optionally each, other receiver.

The relative angular orientation of at least one, and preferably each, transmitter or signal relative to the angular orientation of at least one, and preferably each, receiver may be different from the angular orientation of at least one, and preferably each, other transmitter or signal relative to the angular orientation of the at least one or each receiver.

The transmission axis of at least one transmitter or a signal transmitted thereby may be angled or oriented differently or obliquely to the transmission axis of at least one other transmitter or a signal transmitted thereby.

The optimal receiving axis of at least one receiver may be angled or oriented differently or obliquely to the optimal receiving axis of at least one other receiver.

The relative angular orientation of the optimal receiving axis of at least one, and optionally each, receiver relative to the angular orientation of the transmission axis of at least one, and optionally each, transmitter or associated signal may be different from the relative angular orientation of the optimal receiving axis of at least one, and optionally each, other receiver relative to the angular orientation of the transmission axis of the at least one or each, transmitter or associated signal.

The system may be configured to use the orientation or angle of the at least one transmitter or a signal transmitted therefrom and/or the at least one receiver and/or the relative orientations of the at least one transmitter or signal transmitted therefrom and at least one receiver to distinguish between transmitters or communications channels and/or to encode or decode data. For example, the system may be configured to use a difference in at least one property of the signal and/or response of the receiver, such as received power or signal intensity, due to differences in orientation or angle of the at least one transmitter or a signal transmitted therefrom and/or the at least one receiver and/or the relative orientations of the at least one transmitter or signal transmitted therefrom and at least one receiver to distinguish between transmitters or communication channels and/or to encode or decode data.

The angular arrangement or relationship of at least one and preferably each transmitter-receiver pair may be known or predetermined. The effect on the response of the receiver and/or property of the signal due to the angular arrangement or relationship of at least one and preferably each transmitter-receiver pair may be provided as reference data. The reference data may be generated by calibration, calculation, and/or the like. The calculation may be performed in use or in situ. The reference data may be stored as a look up table, or the like. The reference data may be calculated or recalculated, e.g. in use or in real time.

The communications system may be or comprise an optical communications system, such as a visible light communication (VLC) system. The transmitter may comprise an optical transmitter, such as a visible light transmitter. The receiver may comprise an optical receiver, such as a visible light receiver.

Each transmitter may comprise a light source, such as an LED, an OLED, a laser, a laser diode, and/or the like. Each receiver may comprise a light detector element, such as a photodiode, a light sensitive MOS-capacitor, and/or or pixel unit of a CCD or CMOS image detector, and/or the like.

However, each transmitter may not directly generate light and/or each receiver may not directly generate an electrical signal upon receipt of light. Instead, it will be appreciated that the transmitters and/or receivers may be or comprise indirect transmitters or receivers. In other words, the transmitter may optionally transmit light generated by a separate light source and/or each receiver may optionally receive light but convert it into an electrical signal at a separate element. For example, each transmitter may comprise an element of an array of optical elements, such as an addressable, active optical array, wherein each element may be imprinted with a different signal. The transmitters (e.g. the elements) may then be illuminated by a separate light source, such as a laser, and the transmitters (e.g. the elements) may be addressable (e.g. electronically or optically) to modulate the beam (e.g. by switching state or otherwise). Conversely, each receiver may comprise an element of a multi-input active array of optical elements, wherein the signals received by each receiver (e.g. element) may be directed to one or more devices for converting the optical signal into an electrical signal, such as a photodiode.

The communications system may comprise a transmitter array and the at least one transmitter may be comprised in the transmitter array. The transmitter array may be or comprise a one, two or three dimensional array.

The communications system may comprise a receiver array and the at least one receiver may be comprised in the receiver array. The receiver array may be or comprise a one, two or three dimensional array.

The array of transmitters and/or the array of receivers may be or comprise a shaped array, such as a curved array, e.g. a concave and/or convex array. The transmission axis of at least one, preferably a plurality of and optionally each, of the transmitters and/or the optimal receiving axis of at least one, preferably a plurality of and optionally each, of the receivers may be perpendicular or normal to the curve or shape of the array, e.g. to the concave or convex shape or surface.

At least one, optionally a plurality of, and preferably each receiver may comprise a limited or narrow field of view. For example the field of view of at least one and optionally each receiver may not overlap with at least one and preferably each other receiver, or may only overlap with adjacent receivers and/or receivers that are, for example, one, two, three, four or five times removed in array position from the at least one or optionally each receiver.

The array of receivers may comprise groups of receivers, each group comprising a plurality of receivers. The field of view of at least one and optionally each group of receivers may not overlap with at least one and preferably each other group of receivers, or may only overlap with adjacent groups of receivers or groups of receivers that are one, two, three, four or five times removed in array position from the at least one or optionally each groups of receivers.

The above arrangements may advantageously reduce interference and/or allow or improve distinction between, or identification of, transmitters, signals and/or communications channels.

The system may be configured to perform scans for received signals. The scan may be a scan over the entire receiving space of the receiver system. Such scans may be performed initially and/or periodically and/or according to a given protocol or criteria. The scans may comprise determining which receiver or receivers in the array can receive signals from the or each transmitter(s) or which receiver or receivers in the array can receive the strongest signals from the or each transmitter. The system may be configured to activate or address selected receivers for receiving signals during communications. For example, the activated or addressed receiver or receivers may be those receivers for which a signal from at least one and optionally each transmitter is received or the strongest. The other receivers may be non-activated or not addressed, i.e. signals may be generated from less than all of the receivers. This may further reduce interference and/or allow or improve distinction between, or identification of, transmitters, signals and/or communications channels.

The transmitter and/or receiver may be provided with an optical system for modifying the angle or orientation of at least one signal path or axis. The optical system may comprise one or more optical components or portions of optical components, such as lenses, e.g. concave or convex lenses and/or multi-facetted lenses, or reflective or refractive elements, or holographic elements, or active optical elements and/or the like.

The optical system may be configured to modify the beam or signal path of a beam emitted from one or more and preferably each transmitter, such that the angle of the signal or beam path received by one or more, and optionally each, receiver from the at least one, and optionally each, transmitter is different to the angle at which the signal or beam path from the at least one or each transmitter is received by at one or more, and optionally each, other receiver.

The system may be configured such that the angle or orientation of at least one and optionally each of the transmitter(s) and/or the beam axis of the signals or beams emitted thereby and/or the receiver(s) may be variable and/or adjustable. For example, the angle or orientation of the transmitter(s) or the beam axis of the associated signals or beams may be adjustable or variable such that the associated signals or beams are received or preferentially received by one or more receivers or groups of receivers or at a distinctive or indicative angle to one or more receivers or groups of receivers.

The system may be configured to transmit using orthogonal frequency division multiplexing (OFDM), e.g. optical-OFDM. The system may be or comprise a cellular system. For example, the system may comprise or be configured to implement a plurality of cells. Each cell may comprise and/or be associated with one or more of the transmitters and/or one or more of the transceivers. At least one or more or each of the transmitters and/or receivers comprised in and/or associated with a given cell may be exclusively associated with that cell, One or more or each of the transmitters of at least one or each of the cells may be comprised in a transmitter system or source, which may be, comprise or be comprised in an optical access point. Each cell may comprise one or more transmitter systems or sources.

A plurality of the receivers may be comprised in a receiver system, which may be, comprise or be comprised in an angle diversity receiver (ADR). The system may comprise one or more receiver systems. At least one or more or each of the receivers of at least one or more or each of the receiver systems may be angled, e.g. obliquely angled, relative to at least one or more or each other receiver of the respective receiver system. At least one or more or each receiver of at least one or more or each cell or receiver system may be angled with respect to at least one or more or each other receiver of the respective cell or receiver system by an angle that is the same as and/or greater than the field of view angle or half angle of at least one or each receiver. At least one or more or each receiver system may comprise one, two or more, e.g. three or more, such as seven or more receivers. The receivers in an receiver system may be distributed around a hemi-spherical surface.

At least one or more or each of the access points for one or more or each of the cells may be spaced apart from at least one or more or each other access point in the respective cell, e.g. by at least 0.1 m, 0.2 m or more, such as between 0.1 and 0.4 m, e.g. between 0.2 m and 0.3 m.

The system may be configured such that one or more receiver or receiver system receives one or more of the signals due to line of sight (LOS) propagation and/or receives one or more of the signals due to non-line of sight (NLOS) propagation (e.g. which may comprise signals received after one or more reflections or other optical process).

At least one or more or each cell may comprise a plurality of transmitter systems or sources, e.g. a plurality of access points. For example at least one or more or each cell may comprise two transmitter systems or sources or one or more pairs of transmitter systems or sources.

At least one of the transmitter systems or sources of the one or more or each cell or pair of transmitter systems or sources may be configured to transmit, e.g. concurrently transmit, the same information and/or signal as at least one or more other of the transmitter systems or sources of the respective cell or pair of transmitter systems or sources. At least one of the transmitter systems or sources of the one or more or each cell or pair of transmitter systems or sources may be configured to transmit, e.g. concurrently transmit, a signal that interferes destructively with the signal transmitted by at least one or more other of the transmitter systems or sources of the respective cell or pair of transmitter systems or sources. At least one of the transmitter systems or sources of the one or more or each cell or pair of transmitter systems or sources may be configured to transmit, e.g. concurrently transmit, a signal that is the opposite polarity or sign or is the inverse of the signal transmitted by at least one or more other of the transmitter systems or sources of the respective cell or pair of transmitter systems or sources.

The system may be configured to combine or process the signals received by the receivers of at least one of the receiver systems, e.g. according to a signal combination scheme. For example, system may be configured to combine or process the signals received by the receivers of the at least one receiver system according to an equal gain combining (EGC) scheme, a select best combining (SBC) scheme, a maximum ratio combining (MRC) scheme, an optimum combining (OPC) scheme and/or the like.

The system may be configured to select one receiver of the at least one receiver system to establish a link with a transmitter, transmitter system or source. The system may be configured to determine the signal to noise ratio achieved by at least one or each receiver in at least one or each of the receiver systems. The system may be configured to select, or use only the signal from, the receiver achieving or having the highest signal to noise ratio.

The system may be configured to combine the signals received from one or more or each receiver of an ADR, e.g. with equal weight, or with a weight factor that is proportional or dependent on the signal to noise ratio for the associated receiver, or with a weight that depends on signal to noise ratio, interference and/or interference-plus-noise correlation, and/or the like.

The system may be or comprise a multiple-input multiple-output (MIMO) system. It will be appreciated that any suitable arrangement that imparts a usable angular relationship between the transmitters and receivers may be used in a MIMO system.

For example, at least one or each of the transmitters itself may be or comprise an array of transmitter elements, which may be or comprise elements of a MIMO array. At least one or each such transmitter, which may comprise the array of transmitter elements, may function as a multiple output array or source for a MIMO system. The at least one or each individual transmitter (i.e. comprising the array of transmitter elements) may at least partially provide the angular dependence, angularly dependent property, angularly dependent response and/or have a distinct angularly dependent arrangement or relationship with the at least one receiver. In other words at least one or each transmitter may itself function as a MIMO array, wherein the transmitter elements may be the elements of the MIMO array.

At least one or each of the transmitters may comprise a plurality of groups, each group comprising one or more, e.g. a plurality of, transmitter elements, which may be elements of a MIMO array. The groups may be arranged such that the plurality of groups as a whole may at least partially provide the angular dependence, angularly dependent property, angularly dependent response and/or have a distinct angularly dependent arrangement or relationship with the at least one receiver.

A plurality of the transmitters may be provided in a MIMO array. In other words, individual transmitters may be, comprise or be comprised in the elements of the MIMO array.

According to a second aspect of the present invention is a transmission system, the transmission system comprising a plurality of transmitters for transmitting signals.

The transmitters or transmission system may have an angular dependence, such that at least one property of the signals emitted by the transmitters or transmission system may be angularly dependent;

At least one transmitter or the signal transmitted therefrom may have an angular arrangement that is different to the angular arrangement of at least one other transmitter or the signal transmitted therefrom.

The angularly dependant property may be usable to identify or discriminate the transmitter from which the signal was transmitted and/or at least one communication channel associated therewith.

At least one and optionally each transmitter is configured such that the beam path of the signal transmitted by at least one and optionally each transmitter is angled and/or oblique to the beam path of the signal transmitted by at least one and optionally each other transmitter.

The at least one and optionally each transmitter may be angled relative to at least one and optionally each other transmitter.

The transmission system may be configured for use in a static deployment, such as in a point-to-point infrastructure, such that at least one, and preferably each, transmitter is associated with a predetermined angle or orientation of the transmitter or a signal produced thereby and/or a relative angular orientation of the transmitter or signal relative to one or more receivers.

The transmission system may be configured for use with mobile devices such that the angular arrangement or relationship of at least one and preferably each beam path may be calibrated or calculated relative to one or more receivers in use or in real-time.

The transmission system may be configured to encode a signal by selection of a transmitter to use to transmit a signal, e.g. the transmission system may be configured to use spatial encoding.

The transmission system may comprise an optical system, which may comprise one or more components, such as a lens, e.g. a concave and/or convex lens or multi-facetted lens. The optical system may be configured to modify the direction and/or angle of the beam path of the signal emitted by at least one and optionally each transmitter differently to the beam path of a signal emitted by at least one and optionally each other transmitter. The optical system may be configured to modify the direction and/or angle of the beam paths of the signals transmitted by the at least one or each transmitter such that the beam path of the signal receiver at one or more, and preferably each, of the receivers from the at least one or each transmitter is distinct, e.g. angled and/or oblique, to the beam path of the signal received at one or more, and preferably each, of the receivers from at least one, and optionally each, other transmitter.

At least one, and optionally each, transmitter may have an associated transmission axis. The transmission axis may be an axis for which the power transmitted by the transmitter is the highest. The power emitted by the transmitter(s) may vary angularly, e.g. the power emitted by the transmitter along an axis that is angled to its associated transmission axis may be lower than the power emitted along its transmission axis. The power emitted by the transmitter(s) along an axis may be inverse to the angle between the axis and the associated transmission axis.

The transmitters may comprise or be comprised in an array of transmitters, such as a one, two or three dimensional array. The array may be or comprise a shaped array, such as curved array, e.g. concave and/or convex array. The transmission axis of at least one, preferably a plurality of and optionally each, of the transmitters may be perpendicular or normal to the shape of the array, e.g. to the concave or convex shape or surface.

The transmitter may be or comprise an optical transmitter.

Each transmitter may comprise a light source, such as an LED, an OLED, a LCD, a quantum dot emitter, a laser, a LCD laser, a laser diode, and/or the like.

Each transmitter may not directly generate light. Instead, it will be appreciated that the transmitters may be or comprise indirect transmitters. In other words, the transmitter may optionally transmit light generated by a separate light source.

The transmission system may be configured such that the angle or orientation of at least one and optionally each of the transmitter(s) and/or the beam axis of the signals or beams emitted thereby may be variable and/or adjustable. For example, the angle or orientation of the transmitter(s) or the beam axis of the associated signals or beams may be adjustable or variable such that the associated signals or beams are received or preferentially received by one or more receivers or groups of receivers or at a distinctive or indicative angle to one or more receivers or groups of receivers.

The transmission system may be configured to transmit using orthogonal frequency division multiplexing (OFDM), e.g. optical-OFDM. The transmission system may be configured for use in, or arranged or arrangable in, a cellular system. For example, the transmission system may comprise or be configured to implement a plurality of cells. Each cell may comprise and/or be associated with one or more of the transmitters. At least one or more or each of the transmitters comprised in and/or associated with a given cell may be exclusively associated with that cell.

One or more or each of the transmitters of at least one or each of the cells may be comprised in a transmitter system or source, such as an optical access point. Each cell may comprise one or more transmitter systems or sources.

At least one or more or each of the transmitter systems or sources for at least one or more or each of the cells may be spaced apart from at least one or more or each other transmitter system or source in the respective cell, e.g. by at least 0.1 m, 0.2 m or more, such as between 0.1 and 0.4 m, e.g. between 0.2 m and 0.3 m.

At least one or more or each cell may comprise a plurality of transmitter systems or sources, e.g. a plurality of access points. For example, at least one or more or each cell may comprise two transmitter systems or sources or one or more pairs of transmitter systems or sources.

At least one of the transmitter systems or sources of the one or more or each cell or pair of transmitter systems or sources may be configured to transmit, e.g. concurrently transmit, the same information and/or signal as at least one or more other of the transmitter systems or sources of the respective cell or pair of transmitter systems or sources.

At least one of the transmitter systems or sources of the one or more or each cell or pair of transmitter systems or sources may be configured to transmit, e.g. concurrently transmit, a signal that interferes destructively with the signal transmitted by at least one or more other of the transmitter systems or sources of the respective cell or pair of transmitter systems or sources. At least one of the transmitter systems or sources of the one or more or each cell or pair of transmitter systems or sources may be configured to transmit, e.g. concurrently transmit, a signal that is the opposite polarity or sign or is the inverse of the signal transmitted by at least one or more other of the transmitter systems or sources of the respective cell or pair of transmitter systems or sources.

The transmitter system may be or comprise a multiple-input multiple-output (MIMO) system. It will be appreciated that any suitable arrangement that imparts a usable angular relationship between the transmission system or transmitters and receivers may be used in a MIMO system.

For example, at least one or each of the transmitters itself may be or comprise an array of transmitter elements, which may be or comprise elements of a MIMO array. At least one or each such transmitter, which may comprise the array of transmitter elements, may function as a multiple output array or source for a MIMO system. The at least one or each individual transmitter (i.e. comprising the array of transmitter elements) may at least partially provide the angular dependence, angularly dependent property, angularly dependent response and/or have a distinct angularly dependent arrangement or relationship with the at least one receiver. In other words at least one or each transmitter may itself function as a MIMO array, wherein the transmitter elements may be the elements of the MIMO array.

At least one or each of the transmitters may comprise a plurality of groups, each group comprising one or more, e.g. a plurality of, transmitter elements, which may be elements of a MIMO array. The groups may be arranged such that the plurality of groups as a whole may at least partially provide the angular dependence, angularly dependent property, angularly dependent response and/or have a distinct angularly dependent arrangement or relationship with the at least one receiver.

A plurality of the transmitters may be provided in a MIMO array. In other words, individual transmitters may be, comprise or be comprised in the elements of the MIMO array.

The transmitter may be configured or adapted for use with or in the system of the first aspect.

According to a third aspect of the present invention is a receiver system comprising a plurality of receivers for receiving signals, wherein at least one response of one or more, and preferably each, of the receivers is angularly dependent;

the angular arrangement of at least one, and preferably each, receiver or the signals received thereby is different to the angular arrangement of at least one, and preferably each, other receiver or the signals received thereby; and the angularly dependant response is used or usable to identify a transmitter from which the signal was transmitted and/or at least one communication channel associated therewith.

At least one, and optionally each, of the receivers may be arranged to receive a signal from at least one transmitter at a different angle to a signal from at least one other transmitter.

The receivers may be configured such that a signal from a given transmitter is received by at least one, and optionally each, receiver at a different angle to which the signal is received by at least one, and optionally each, other receiver.

The receiver system may be configured to determine or discriminate a transmitter and/or an associated communications channel and/or to decode a signal, based on the angularly dependent response of the receiver. The angularly dependent response may vary depending on the angle at which the signal is received at the receiver and/or an associated change in property of the signal that is dependant on the receiving angle of the signal, such as normalised received power.

At least one and optionally each receiver may be angled and/or oblique to at least one and optionally each other receiver.

The response generated by the receiver for a given received signal may vary depending on the angle at which the signal was received.

An optimal receiving axis of at least one and optionally each receiver may be angled and/or oblique to the optimal receiving axis of at least one and optionally each other receiver. The optimal receiving axis may be a signal or beam axis or path for which the response generated by the receiver for a given signal is the highest.

The receiver system may comprise an optical system, which may comprise one or more components, such as a lens, e.g. a concave and/or convex lens or multi-facetted lens or holographic elements or active optical elements. The optical system may be configured to modify the direction and/or angle of the beam path or axis of a signal from at least one, and preferably each, transmitter such that the signal is received by at least one and optionally each receiver at a different angle to the angle at which a signal from at least one, and preferably each, other transmitter is received by the respective receiver(s). The optical system may be configured to modify the direction and/or angle of the beam path or axis of a signal from a given transmitter such that the signal is received by at least one and optionally each receiver at a different angle to the angle at which the signal is received at least one and optionally each other receiver.

The receiver may comprise an optical receiver, such as a photodiode, a light sensitive MOS-capacitor, and/or or pixel unit of a CCD or CMOS image detector, and/or the like.

However, each receiver may not directly generate an electrical signal upon receipt of light. Instead, it will be appreciated that the receivers may be or comprise indirect receivers. In other words, the receiver may optionally receive light but convert it into an electrical signal at a separate element.

The receiver system may comprise at least one array of receivers. The receiver may comprise or be comprised in the array, such as a one, two or three dimensional array.

The array may be or comprise a shaped array, such as curved array, e.g. concave and/or convex array. The optimal receiving axis of at least one, preferably a plurality of and optionally each, of the receivers may be perpendicular or normal to the shape of the array, e.g. to the concave or convex shape or surface.

At least one, optionally a plurality of, and preferably each receiver may comprise a limited or narrow field of view. For example the field of view of at least one and optionally each receiver may not overlap with at least one and preferably each other receiver, or only overlap with adjacent receivers and/or receivers that are one, two, three, four or five times removed in array position, for example, from the at least one or optionally each receiver.

The array of receivers may comprise groups of receivers, each group comprising a plurality of receivers. The field of view of at least one and optionally each group of receivers may not overlap with at least one and preferably each other group of receivers, or only overlap with adjacent groups of receivers or groups of receivers that are one, two, three, four or five times removed in array position from the at least one or optionally each groups of receivers.

The receiver system may be configured to perform scans for received signals. The scan may be a scan over the entire receiving space of the receiver system. Such scans may be performed initially and/or periodically and/or according to a given protocol or criteria. The scans may comprise determining which receiver or receivers in the array can receive signals from the or each transmitter(s) or which receiver or receivers in the array can receive the strongest signals from the or each transmitters. The receiver system may be configured to activate or address selected receivers for receiving signals during communications. For example, the activated or addressed receiver or receivers may be those receivers for which a signal from at least one and optionally each transmitter is received or the strongest. The remaining receivers may be non-activated or not addressed. This may further reduce interference and/or allow or improve distinction between, or identification of, transmitters, signals and/or communications channels.

The receiver system may be configured to operate using orthogonal frequency division multiplexing (OFDM), e.g. optical-OFDM. The receiver system may be or comprise a cellular system. For example, the receiver system may comprise or be configured to implement a plurality of cells. Each cell may comprise and/or be associated with one or more of the receivers. At least one or more or each of the receivers comprised in and/or associated with a given cell may be exclusively associated that cell, A plurality of the receivers may be comprised in an angle diversity receiver (ADR). The receiver system may comprise one or more ADRs. At least one or more or each of the receivers of at least one or more or each of the ADRs may be angled, e.g. obliquely angled, relative to at least one or more or each other receiver of the respective ADR. At least one or more or each receiver of at least one or more or each cell or ADR may be angled with respect to at least one or more or each other receiver of the respective cell or ADR by an angle that is the same as and/or greater than the field of view angle or half angle of at least one or each receiver. At least one or more or each ADR may comprise one, two or more, e.g. three or more, such as seven or more receivers. The receivers in an ADR may be distributed around a hemi-spherical surface.

The receiver system may be configured such that one or more receiver or ADR receives one or more of the signals due to line of sight (LOS) propagation and/or receives one or more of the signals due to non-line of sight (NLOS) propagation (e.g. which may comprise signals received after one or more reflections or other optical process).

The receiver system may be configured to receive signals from two or more transmitters or one or more pairs of transmitters, such as transmitters associated with the same cell. At least one or each of the receivers of at least one or more or each cell or ADR may be configured to receive the same information and/or signal from at least two different transmitters of at least one or more or each cell or pair of transmitters. At least one or each of the receivers of at least one or more or each cell or ADR may be configured to receive a signal from at least one of the transmitters of the one or more or each cell or pair of transmitters that interferes destructively with the signal transmitted by at least one or more other of the transmitters of the respective cell or pair of transmitters. At least one or each of the receivers of at least one or more or each cell or ADR may be configured to receive a signal from at least one of the transmitters of the one or more or each cell or pair of transmitters that is the opposite polarity or sign or is the inverse of the signal transmitted by at least one or more other of the transmitters of the respective cell or pair of transmitters.

The receiver system may be configured to combine or process the signals received by the receivers of an ADR, e.g. according to a signal combination scheme. For example, the receiver system may be configured to combine or process the signals received by the receivers of an ADR according to an equal gain combining (EGC) scheme, a select best combining (SBC) scheme, a maximum ratio combining (MRC) scheme, an optimum combining (OPC) scheme and/or the like.

The receiver system may be configured to select one receiver of an ADR to establish a link with a transmitter or access point. The receiver system may be configured to determine the signal to noise ratio achieved by at least one or each receiver in at least one or each of the ADRs. The receiver system may be select or use only the signal from the receiver achieving or having the highest signal to noise ratio.

The receiver system may be configured to combine the signals received from one or more or each receiver of an ADR, e.g. with equal weight, or with a weight factor that is proportional or dependent on the signal to noise ratio for the associated receiver, or with a weight that depends on signal to noise ratio, interference and/or interference-plus-noise correlation, and/or the like.

The receiver system may be configured or adapted for use in the system of the first aspect.

According to a fourth aspect of the present invention is a transmission system configured for use in, or arranged or arrangable in, a cellular system. For example, the transmission system may comprise or be configured to implement a plurality of cells. The transmission system may comprise a plurality of transmitters. The transmitters may be as described above in relation to the first and/or second aspects. The transmission system may be a MIMO transmission system, e.g. the transmission system may be, comprise or be comprised in a MIMO transmission array. Each cell may comprise and/or be associated with one or more transmitters. At least one or more or each of the transmitters comprised in and/or associated with a given cell may be exclusively associated with that cell.

One or more or each of the transmitters of at least one or each of the cells may be comprised in a transmitter system or source, such as an optical access point. Each cell may comprise one or more transmitter systems or sources.

At least one or more or each of the transmitter systems or sources for at least one or more or each of the cells may be spaced apart from at least one or more or each other transmitter system or source in the respective cell, e.g. by at least 0.1 m, 0.2 m or more, such as between 0.1 and 0.4 m, e.g. between 0.2 m and 0.3 m.

At least one or more or each cell may comprise a plurality of transmitter systems or sources, e.g. a plurality of access points. For example, at least one or more or each cell may comprise two transmitter systems or sources or one or more pairs of transmitter systems or sources.

At least one of the transmitter systems or sources of the one or more or each cell or pair of transmitter systems or sources may be configured to transmit, e.g. concurrently transmit, the same information and/or signal as at least one or more other of the transmitter systems or sources of the respective cell or pair of transmitter systems or sources.

At least one of the transmitter systems or sources of the one or more or each cell or pair of transmitter systems or sources may be configured to transmit, e.g. concurrently transmit, a signal that interferes destructively with the signal transmitted by at least one or more other of the transmitter systems or sources of the respective cell or pair of transmitter systems or sources. At least one of the transmitter systems or sources of the one or more or each cell or pair of transmitter systems or sources may be configured to transmit, e.g. concurrently transmit, a signal that is the opposite polarity or sign or is the inverse of the signal transmitted by at least one or more other of the transmitter systems or sources of the respective cell or pair of transmitter systems or sources.

The transmission system may be comprised in the communications system of the first aspect. The transmission system may be, comprise or be comprised in the transmission system of the second aspect. The transmission system may be configured for use with the receiver system of the third aspect.

According to a fifth aspect is a communications system, the communications system comprising at least one transmission system of the fourth aspect. The communications system may be a MIMO communications system.

According to a sixth aspect of the present invention is a method for transmitting a signal using a communications system according to the first or fifth aspects and/or a transmission system according to the second or fourth aspect; the method comprising using the angularly dependant property and/or response to identify the transmitter from which the signal was transmitted and/or the transmitter-receiver pair and/or at least one communication channel associated therewith The method may comprise providing a beam path of the signal of at least one and optionally each transmitter at an angle and/or obliquely to the beam path of at least one and optionally each other transmitter.

The method may comprise encoding a signal and/or identifying or discriminating a transmitter or an associated communications channel by associating one or more, and optionally each, transmitter and/or a signal transmitted thereby with a predetermined angle, orientation and/or relative angular orientation relative to one or more receivers.

According to a seventh aspect of the present invention is a method of receiving a signal using the communications system according to the first or fifth aspect and/or the receiver according to the third aspect; wherein the method comprises using the angularly dependant property and/or response to identify the transmitter from which the signal was transmitted and/or the transmitter-receiver pair and/or at least one communication channel associated therewith.

The method may comprise determining an angle at which a signal is received at one or more of the receivers, and/or at least one property indicative thereof. The method may comprise identifying a transmitter from which the signal was transmitted, and/or a communications channel associated therewith, based on the angle at which a signal is received, and/or at least one response of the receiver indicative thereof, and/or a relative angle between a transmitter and a given receiver and/or at least one response of the receiver indicative thereof.

According to a eighth aspect of the present invention is a computer program product adapted to implement the apparatus of the first, second, third, fourth or fifth aspects of the present invention and/or the method of the sixth or seventh aspects of the present invention.

According to a ninth aspect of the present invention is a carrier medium comprising or encoded with the computer program product of the eighth aspect and/or a programmable and/or processing apparatus when programmed with the computer program product of the eighth aspect.

It should be understood that the features defined above in accordance with any aspect of the present invention or below in relation to any specific embodiment of the invention may be utilised, either alone or in combination with any other defined feature, in any other aspect or embodiment of the invention. Furthermore, the present invention is intended to cover apparatus configured to perform any feature described herein in relation to a method and/or a method of using or producing or manufacturing any apparatus feature described herein.

BRIEF DESCRIPTION OF THE FIGURES

These and other aspects of the present invention will now be described, by way of example only, with reference to the accompanying drawings, in which:

FIG. 14(*b*) is a schematic illustrating the relationship between an access point and a receiver system in the system of FIG. 13;

DETAILED DESCRIPTION OF VARIOUS EMBODIMENTS

Embodiments of the present invention provide a multiple-input multiple-output (MIMO) optical communication system in which transmitter-receiver pairs have a predetermined angular arrangement of the receiver, the transmitter and/or a signal transmitted by the transmitter and/or a predetermined relative angular relationship between the receiver and the transmitter and/or the signal transmitted by the transmitter. The transmitters and/or receivers have an angular dependence such that at least one response of the receivers to the received signal varies depending on the angle at which the signal is received and/or at least one property of the signals from the transmitters varies depending on angle from a transmission axis of the respective transmitter and/or signal. In this way, by determining the response or property or a variation therein, at the receiver side, the transmitter used to send the signal and/or a communication channel that is associated therewith can be identified or discriminated from other transmitters or communications channels. In addition, data encoded by position or selection of transmitters (e.g. position encoding) can be decoded.

Figure 1:
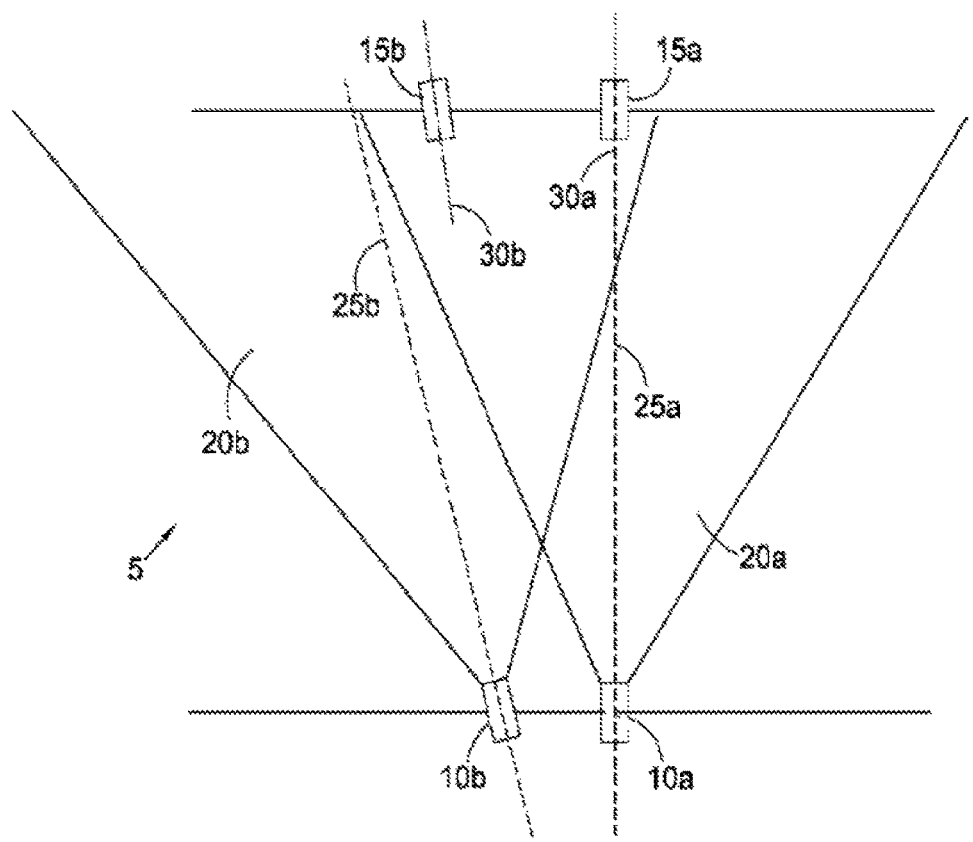
FIG. 1 is a schematic of an optical communications system according to embodiments of the present invention.

FIG. 1 illustrates an optical communications system 5 comprising an array of optical transmitters 10*a*-10*b* or transmitting elements and an array of optical receivers 15*a*-15*b* or receiving elements. Each of the transmitters 10*a*-10*b* is operable to transmit a signal 20*a*-20*b* and each of the receivers 15*a*-15*b* is operable to receive and detect signals 20*a*-20*b* from the transmitters 10*a*-10*b*.

Advantageously, the transmitters 10*a*-10*b* comprise fast switching solid state light sources such as LEDs, OLEDs and the like. The intensity or power (or one or more other properties) of the transmitted signal 20*a*-20*b* varies angularly. For example, each transmitter 10*a*-10*b* emits a signal 20*a*-20*b* along an associated transmission axis 25*a*-25*b*, along which the intensity or power of the signal 20*a*-20*b* is a maximum, and the intensity or power of the signal 20*a*-20*b* measured on an axis rotated about the transmitter 10*a*-10*b* reduces with increasing angle of rotation from the transmission axis.

Figure 2:
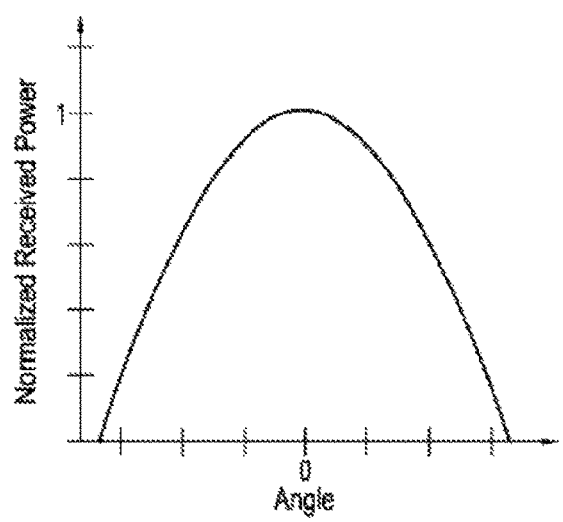
FIG. 2 illustrates the dependence of normalised received power of a signal with an angle at which the signal is received by a receiver of the system of FIG. 1.

The receivers 15*a*-15*b* comprise suitable optical receivers such as photodiodes or photoresistors, e.g. as part of a CMOS or CCD optical detector. The normalised detected or received intensity or power (or one or more other responses) of the receivers 15*a*-15*b* varies angularly. For example, each receiver 15*a*-15*b* has an associated optimum receiving axis 30*a*-30*b* for receiving signals 20*a*-20*b*, for which the intensity or power of a received signal 20*a*-20*b* is a maximum. The received intensity or power (or other angularly dependent response) reduces with increasing rotation angle if the signal 20*a*-20*b* is received by the receiver 15*a*-15*b* along an axis rotated about the receiver 15*a*-15*b* from the optimum receiving axis 30*a*-30*b*, as shown in FIG. 2.

The transmitters 10*a*-10*b* and receivers 15*a*-15*b* are arranged such that each transmitter-receiver pair has a distinct angular arrangement and/or relationship. In this way, each transmitter-receiver pair will be associated with a distinct or indicative effect on the received intensity, power and/or other angularly dependent response of the receiver 15*a*-15*b* and/or property of the signal 20*a*-20*b*. By predetermining these effects on the angularly dependent response of the receiver and/or property of the signal, e.g. by calibration, calculation or otherwise, to form reference data, then the received intensity, power and/or other angularly dependent response or property can be used to at least partially determine the transmitter and/or transmitter-receiver pair used to transmit the signal 20a-20b and/or a communication channel associated therewith by comparison of the determined response or property with the reference data.

In this way, the communication channel used to transmit the signal is more accurately identifiable, regardless of transmitter-receiver separation. Furthermore, when transmitter 10a-10b selection is used to encode or partially encode data (e.g. position encoding), then the errors in transmitting data using such techniques can be reduced. Such properties make the system 5 advantageous for use in optical communications systems, such as that shown in FIG. 3, where long transmission distances between transmitters and receivers are possible.

It will be appreciated that there are a variety of ways of providing the required distinct angular arrangements of, or relationships between, the transmitters 10a-10b or the signals 20a-20b transmitted thereby and the receivers 15a-15b.

In the system of FIG. 1, the transmitters 10a-10b and the receivers 15a-15b are arranged in planar arrays with the transmitters 10a-10b and receivers 15a-15b being provided at varying angles or orientations. In this way, it will be appreciated that by selecting appropriate transmitter 10a-10b and receiver 15a-15b orientations, the angle at which the signal 20a-20b from each transmitter 10a-10b is received by each receiver 15a-15b is distinct, thereby resulting in a distinct angularly dependent response from the receiver 15a-15b (in this case an indicative effect on normalized received power) to signals received from different transmitters. By comparing the angularly dependent response with the reference data, for example, it is possible to determine the transmitter used to transmit the signal."

However, it will be appreciated that other possibilities for creating the distinct angular arrangements or relationships associated with transmitter-receiver pairs are possible.

For example, it may not be necessary to arrange both the transmitters 10a-10b and receivers 15a-15b at different angles to the other transmitters 10a-10b or receivers 15a-15b respectively. Instead, only the transmitters 10a-10b or only the receivers 15a-15b or indeed, only some of the transmitters 10a-10b and/or receivers 15a-15b may be provided at different angles to the other transmitters 10a-10b or receivers 15a-15b respectively.

Figure 4:
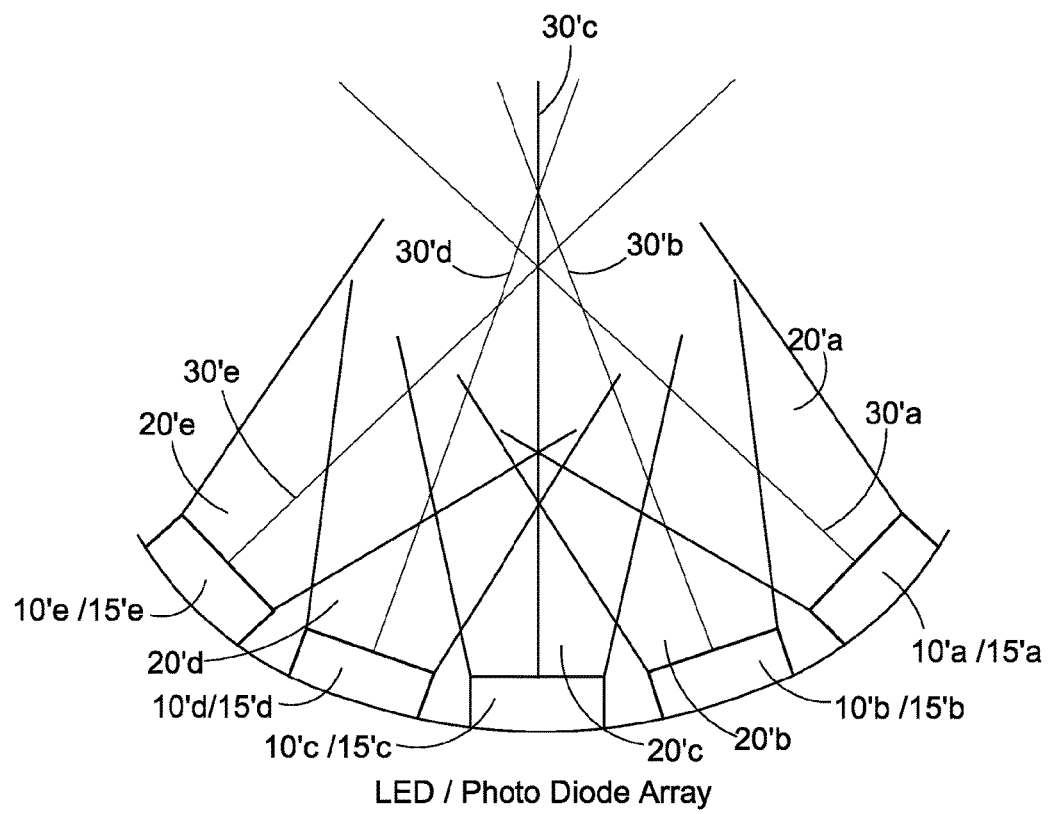
FIG. 4 is a schematic of a transmitter configuration and/or a receiver configuration according to embodiments of the present invention.
Figure 5:
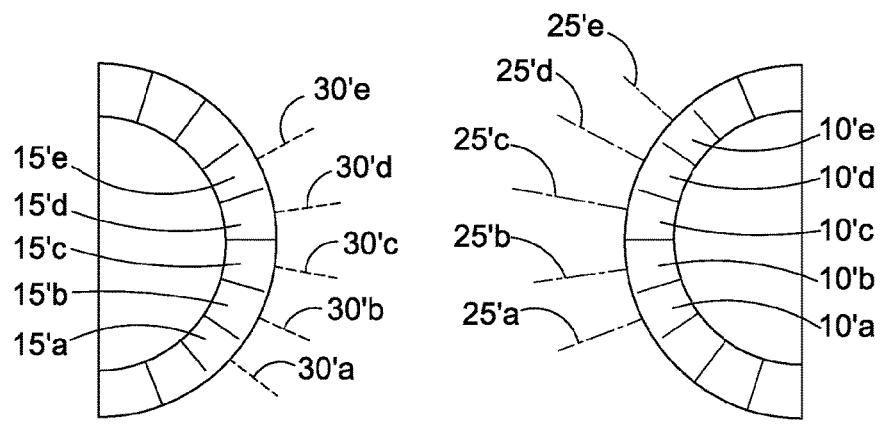
FIG. 5 is an alternative example of an optical communications system according to an embodiment of the present invention.

In particularly advantageous embodiments, shaped, non-planar arrays of transmitters 10'a-10'e and/or receivers 15'a-15'e could be used, such as curved arrays. For example, the transmitters 10'a-10'e and/or receivers 15'a-15'e could be provided in a concave array, as shown in FIG. 4 or a convex array as shown in FIG. 5. The transmission axes 25'a-25'e of the transmitters 10'a-10'e and the optimum receiving axes 30'a-30'e of the receivers 15'a-15'e are provided normal to the curvature of the array so that each transmitter-receiver pair has a distinct angular arrangement and relationship. As such, any signals 20'a-20'e received at the receivers 15'a-15'e from the transmitters 10'a-10'e will result in one or more angularly dependent responses of the receivers that are indicative of the transmitter 10'a-10'e that transmitted the signal 20'a-20'e, which can in turn be used to identify the transmitter 10'a-10'e, e.g. by comparison to reference data.

These shaped arrays advantageously minimise the overlap of the fields of view of the receivers and/or the beam paths of the transmitters.

Whilst concave and/or convex arrangements illustrated in FIGS. 4 and 5 provide advantageous and predictable arrangements, it would be appreciated that other shaped, non-planar arrays or transmitters and/or receivers may be used. Indeed, it will be appreciated that only one of the transmitter array or receiver array need be shaped and the other of the receiver or transmitter array could be planar, and the required distinct angular relationships between transmitter and receiver pairs could still be achieved.

Indeed, the distinct angular dependence between transmitter-receiver pairs need not necessarily be provided by the angle of the transmitter and/or receivers or the shape of the transmitter or receiver array. For example, it will be appreciated that it would be possible to provide the required distinct angular arrangement or relationship associated with transmitter-receiver pairs using one or more suitable optical elements, such as lenses, refractive elements or the like that differently alter the angle or orientation of the signals emitted by different transmitters.

Figure 6:
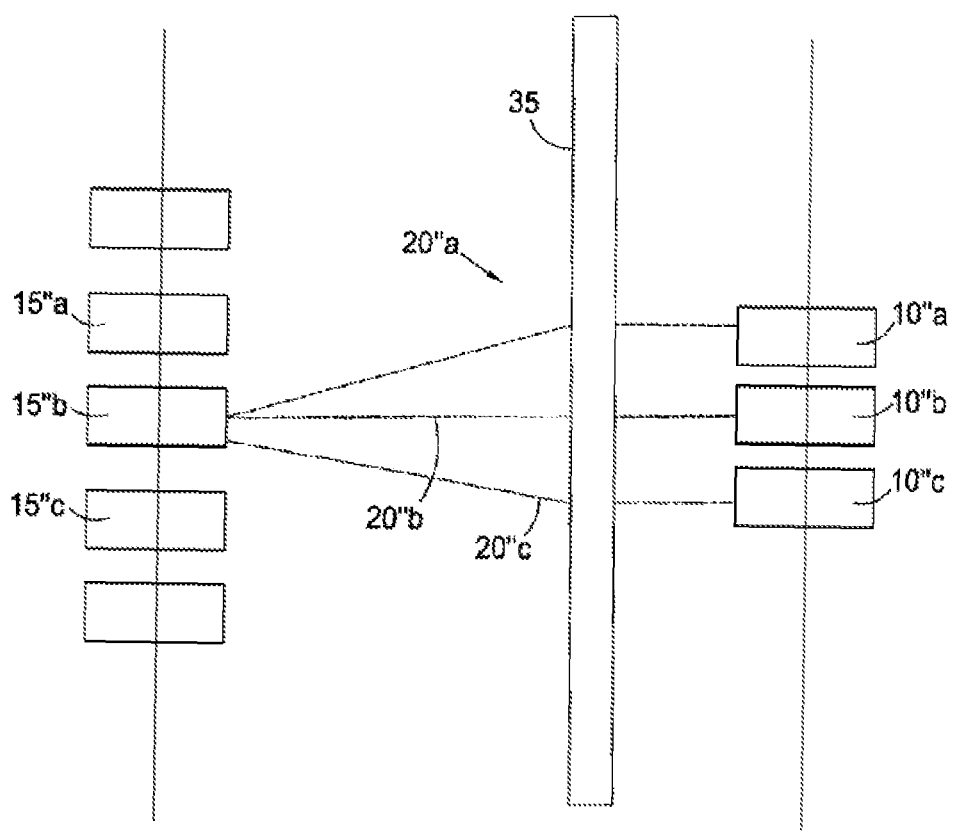
FIG. 6 is another alternative embodiment of an optical communications system according to an embodiment of the present invention.

For example, in the embodiment illustrated in FIG. 6, an optical system 35 is provided between the array of transmitters 10"a-10"c and the array of receivers 15"a-15"c. The arrays of transmitters 10"a-10"c and receivers 15"a-15"c are planar and the transmitters 10"a-10"c and receivers 15"a-15"c are all aligned parallel to each other. However, the optical system 35 is configured such that signals 20"a-20"c of each transmitter 10"a, 10"b, 10"c are rotated or reoriented differently to signals from other transmitters 10"a, 10"b, 10"c. For example, the optical system 35 may be arranged such that signals 20"a, 20"b, 20"c from different transmitters 10"a, 10"b, 10"c fall on different lenses or facets of a facetted lens that have different shapes and/or optical properties. As a result of the optical system 35, each signal 2041 a, 20"b, 20"c from each transmitter 10"a, 10"b, 10"c arrives at each receiver 15"a, 15"b, 15"c at a different angle, thereby producing a different, indicative effect on the angularly dependent response of the receiver, thereby allowing the transmitter 10"a, 10"b, 10"c that transmitted the signal to be determined.

Such an arrangement could be more suited for use with conventional transmitter and/or receiver arrays, e.g. by retrofitting.

Figure 3:
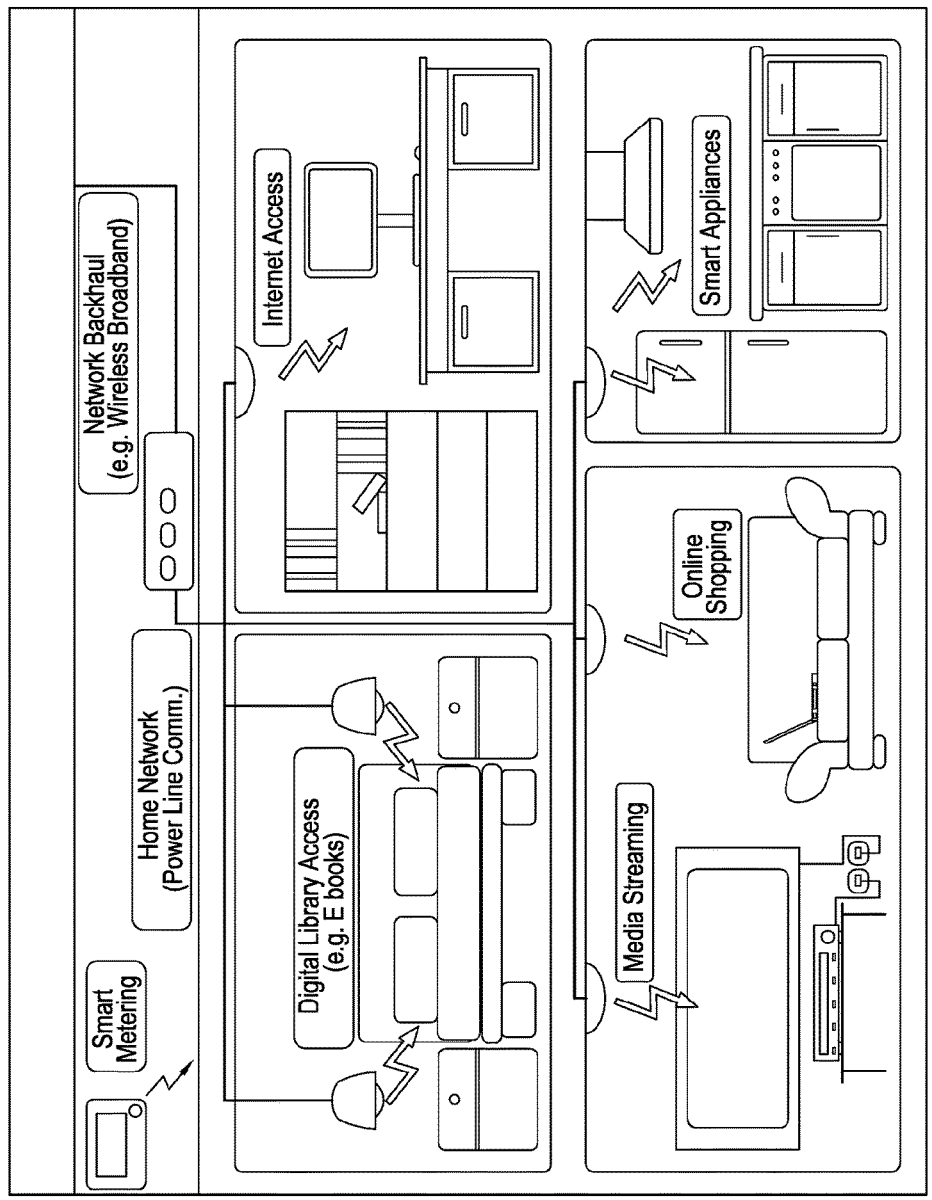
FIG. 3 is an example of an optical network utilising the communication system of FIG. 1.
Figure 7:
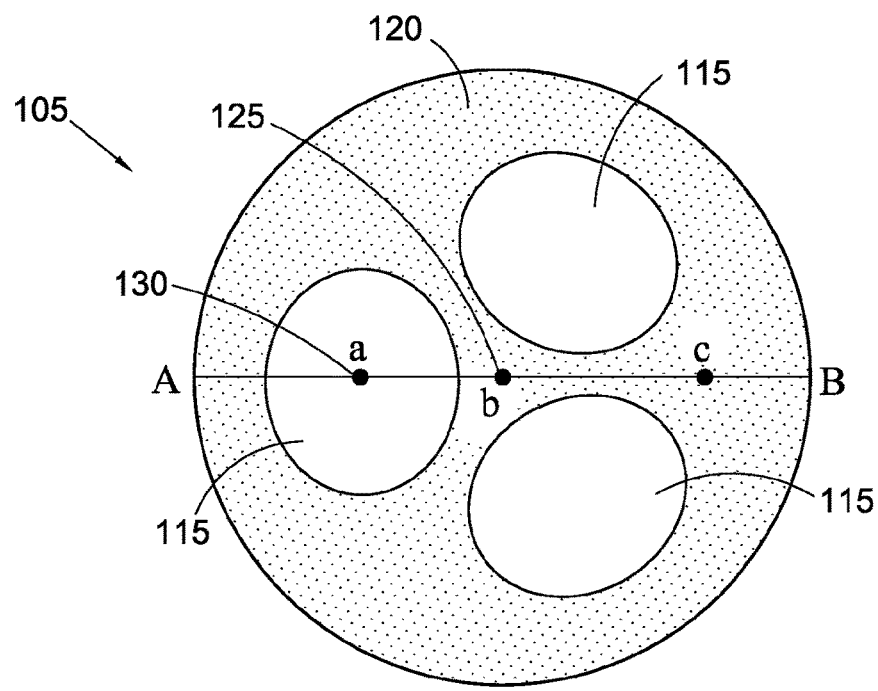
FIG. 7 is a planar view of an optical receiver arrangement.
Figure 8:
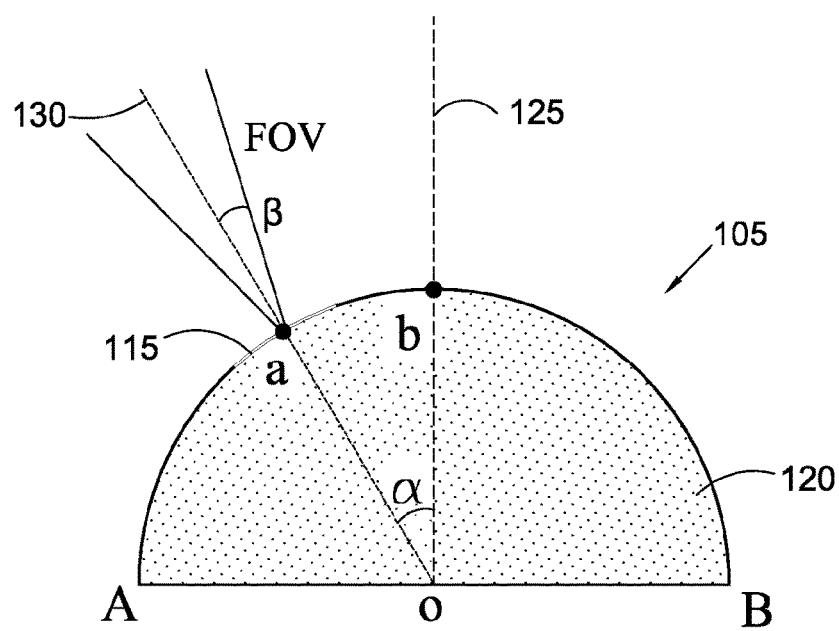
FIG. 8 is a cross sectional elevational view of the receiver arrangement of FIG. 7.

FIGS. 7 and 8 show a receiver system 105 in the form of an angle diversity receiver for use in an optical communications system, such as that shown in FIG. 1, 3 or 6. The receiver system 105 comprises a plurality of receivers 115 (in this example three receivers 115) wherein each receiver 115 is angled obliquely with respect to each of the other receivers 115. The receivers 115 are distributed around a hemi-spherical surface 120 (although it will be appreciated that this need not be the case). The receivers 115 are all even arranged around the central axis/axis 125 of rotation of the receiver system 105. An angle between the central axis 125 (i.e. the angle of rotation) of the receiver system 105 and a central axis or optimal receiving axis 130 of each receiver 115 is an angle α. In this case, a field of view β half angle of each receiver 115 is less than the angle α.

Figure 9:
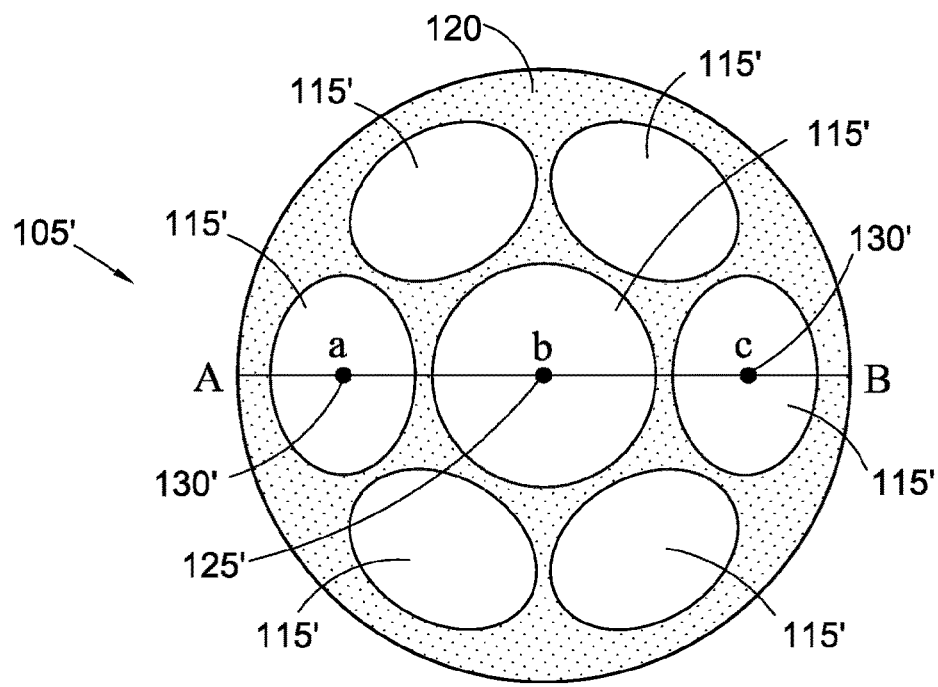
FIG. 9 is a planar view of another optical receiver arrangement.
Figure 10:
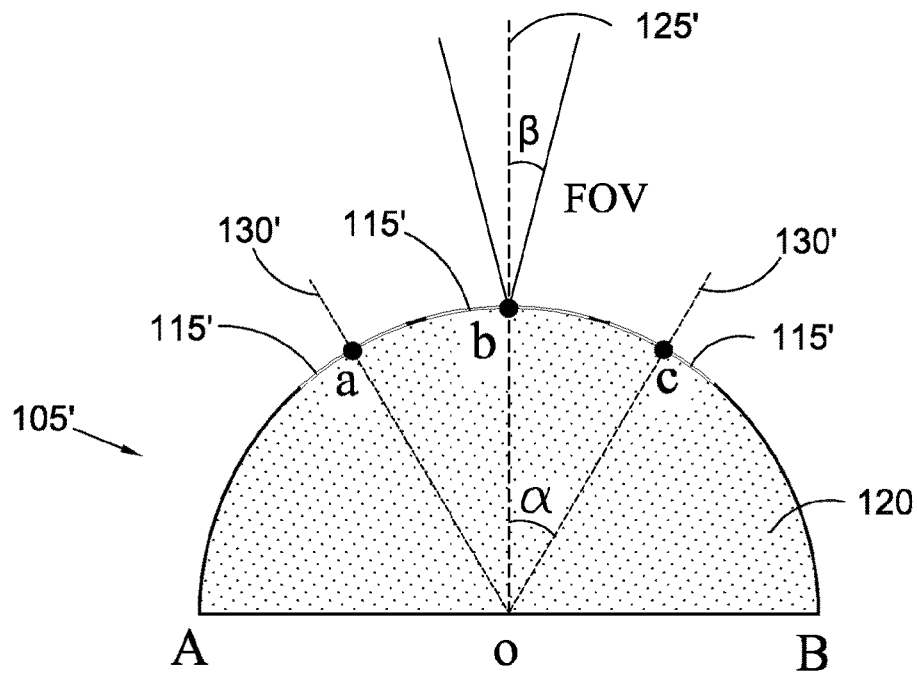
FIG. 10 is a cross sectional elevational view of the receiver arrangement of FIG. 9.

An alternative receiver system 105' having seven receivers 115' is shown in FIGS. 9 and 10. The receiver system 105' of FIGS. 9 and 10 is similar to that of FIGS. 7 and 8, other than the number and positioning of the receivers 115'. In this case, one receiver 115' is aligned with a central/rotation axis 12' of the receiver system 105' and the other six receivers 115' are evenly distributed around the central/rotation axis 125' of the receiver system 115'. However, the field of view β half angle of each receiver 125' is still less than the angle α between the central/rotation axis 125' of the receiver system 105' and the receiving axes or central axes 130' of the other six receivers 115'.

Figure 11:
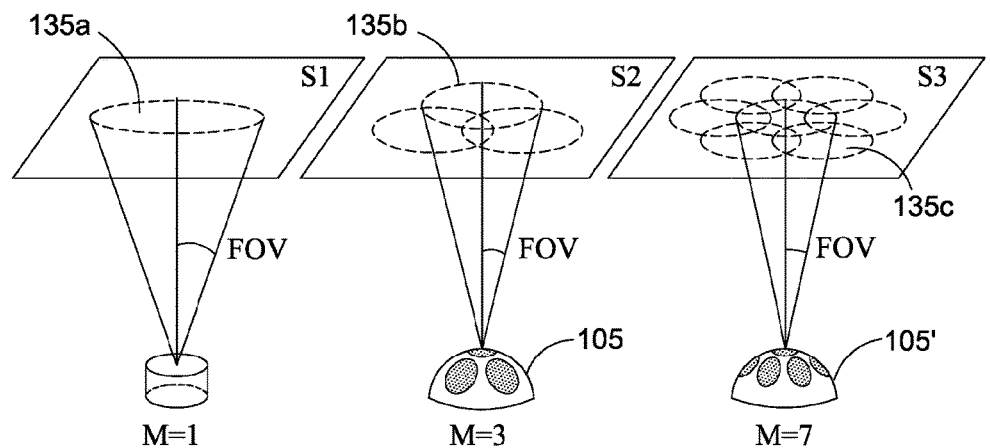
FIG. 11 is a schematic illustrating the relative total fields of view of a receiver arrangement having a single receiver (M=1), the receiver arrangement of FIG. 7 (M=3) and the receiver arrangement of FIG. 9 (M=7)

FIG. 11 shows the relative total fields of view 135a, 135b, 135c of a receiver system having a single receiver (M=1), the receiver system 105 of FIG. 7 (M=3) and the receiver system 105' of FIG. 9 (M=7).

Figure 12:
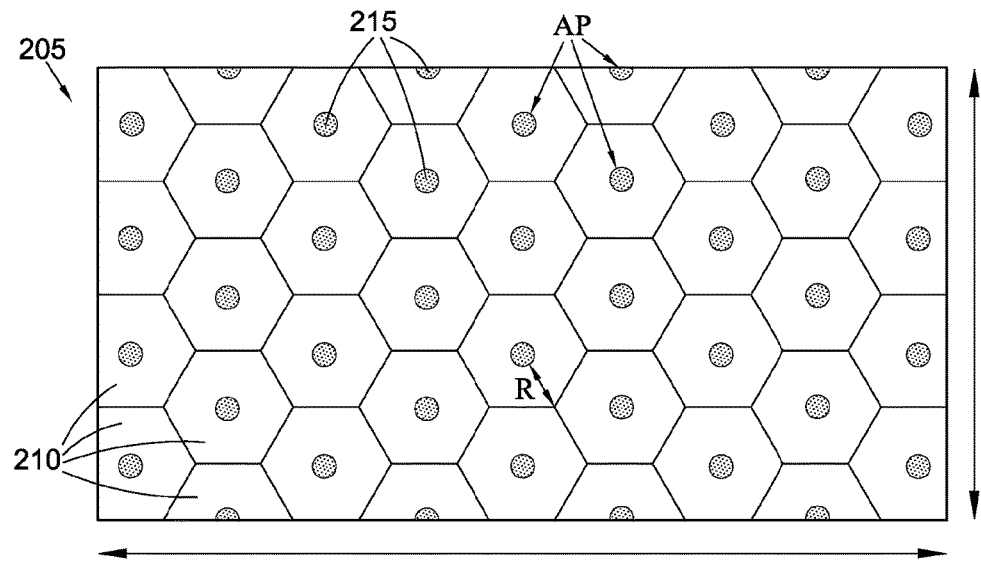
FIG. 12 is a schematic of an arrangement of cells of a cellular optical communications system having a single access point per cell.

FIG. 12 shows a cellular optical communications system 205 having a plurality of cells 210, each cell 210 having a single access point/transmitter system 215 arranged at the centre of each cell 210 (i.e. a distance R from the edge of the respective cell 210). The cells 210 are shown as being hexagonal, although it will be appreciated that other shapes of cells 210 may be used. Each cell 210 borders on a plurality of other cells 210 (in this case six cells). Each transmitter system/access point 215 comprises one or more optical transmitters 10, e.g. as described above in relation to FIGS. 1 to 6.

Figure 13:
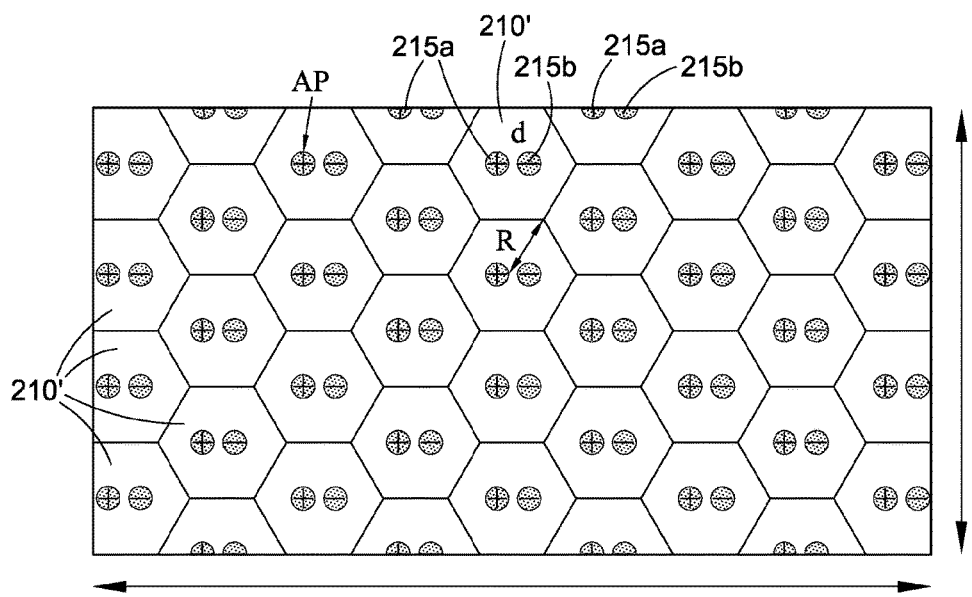
FIG. 13 is a schematic of an arrangement of cells of a cellular optical communications system having a pair of access points per cell.

FIG. 13 shows an advantageous variation on the cellular optical communications system 205 of FIG. 12. In this case two transmitter systems/access points 215a, 2156b per cell 210' are provided, each transmitter system/access point 215a being spaced apart from the other transmitter system/access point 215b in the cell 210' by a distance d.

Figure 14:
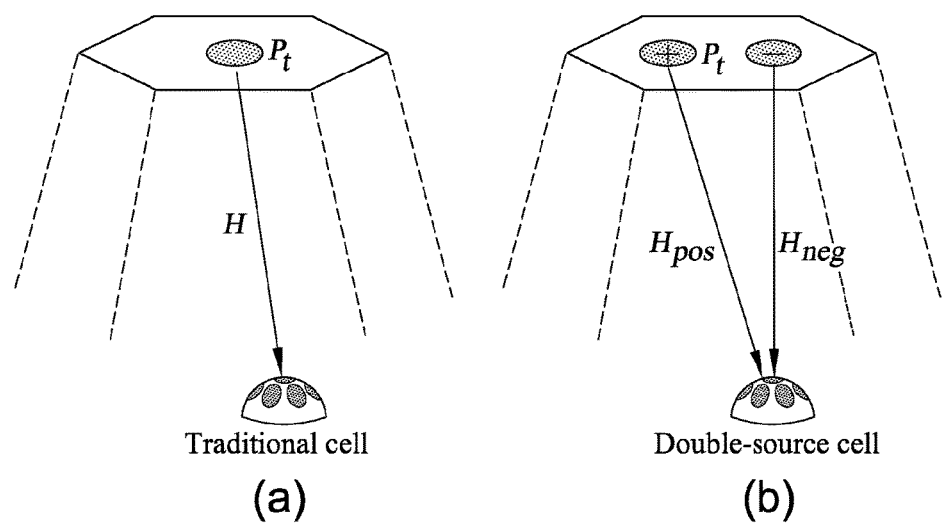
FIG. 14(*a*) is a schematic illustrating the relationship between an access point and a receiver system in the system of FIG. 12.

The communications channels from the transmitter system or access point 215, 215' and the receiver system 105, 105' for the cellular optical communications systems 205 of FIGS. 12 and 13 are shown in FIGS. 14(a) and 14(b) respectively. The receiver systems 105, 105' may comprise a receiver system as shown in any of FIGS. 7 to 10, or indeed any other suitable receiver system, such as those shown in FIGS. 4 or 5.

In the arrangement of FIGS. 13 and 14(b), one of the transmitter systems/access points 215a for each cell 210a is spaced apart from the other transmitter system/access point 215b in the respective cell 210', e.g. by at least 0.1 m, at 0.2 m or more, such as between 0.1 and 0.4 m, e.g. between 0.2 m and 0.3 m. One of the transmitter systems/access points 215a of each cell 210' is configured to concurrently transmit a signal encoding the same information but with opposite polarity to the signal transmitted by the other transmitter system/access point 215b of the respective cell 210'.

In particular, one of the access points 215a is a 'Positive AP' and the other one access point 215b is a 'Negative AP'. The distance between the 'Positive AP' 215a and 'Negative AP' 215b is less than the radius R of the cell 210'. The 'Positive AP' 2215a transmits a signal sequence, S(t), which is the same as the signal sequence that would be transmitted in a conventional cell configuration. The dynamic range of S(t) is from 0 to $S_H$. The 'Negative AP' 215b in this cell 210' transmits the signal sequence S'(t). The relationship between S'(t) and S(t) is represented as:

$$S'(t) = S_H - S(t)$$

the transmission power of the 'Positive AP' 215a and the 'Negative AP' 215b is the same and equal to Ptx. Ptx is the same for all access points. For one cell 210', the received optical signal is represented as:

$$S_{sum} = S(t)H_{pos} + S'(t)H_{neg}$$

The received power of the information signal is:

$$P_{rx} = P_{tx}\Delta H,$$

where $H_{pos}$, is the channel gain between the 'Positive AP' 215a and the optical receiver system 105, 105' and $H_{neg}$ is the channel gain between the 'Negative AP' 215b and the optical receiver system 105, 105'; ΔH denotes the difference between $H_{pos}$ and $H_{neg}$.

Figure 15:
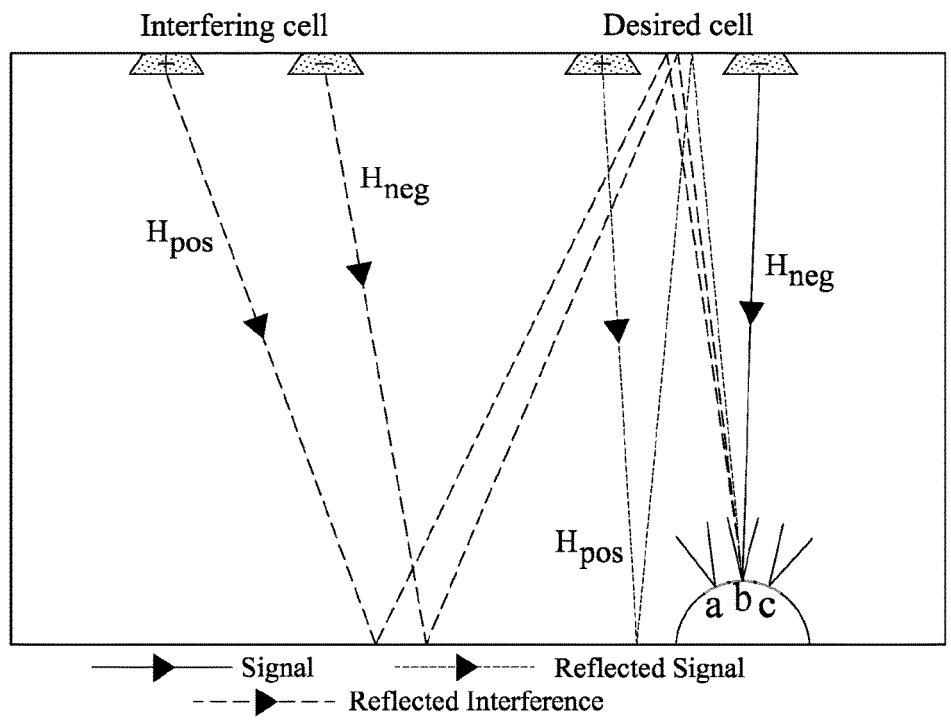
FIG. 15 is a schematic illustrating signals received by a receiver system in a cell of the system of FIG. 13.

Without wishing to be bound by any particular theory, the benefit of deploying a double-access point 215a, 215b cell configuration can be explained by this equation for received power ($P_{rx}$). The signal power at the receiver end is scaled with ΔH. As illustrated in FIG. 15, when an optical receiver system 105, 105' is far from a transmitter system/access point 215a, 215b, the distance from the optical access point 215a, 215b and an optical receiver system 105, 105' is significantly larger than the distance between the two optical access points 215a, 215b. This means the distance between two access points 215a, 215b has very little impact on varying the channel gains, $H_{pos}$ and $H_{neg}$. Therefore, the difference between $H_{pos}$ and $H_{neg}$ is small, which means the received optical signal is attenuated. When the optical receiver system 105, 105' is underneath the optical access point 215a, 215b, the difference between $H_{pos}$ and $H_{neg}$ is large.

This is because, two transmitter systems/access points 215a, 215b in the same optical cell 210' have little chance to simultaneously establish a line of sight with the same receiver 115, 115' at the receiver system 105, 105' due to the narrow field of view of each receiver 115, 115'. Since the difference between a line of sight and a non-line of sight path are significant, the received optical signal is enhanced. Generally, the desired transmitter systems/optical access points 215a, 215b are close to an optical receiver system 105, 105' and the interference transmitter systems/access points 215a, 215b are much further from an optical receiver system 105, 105'. Hence, this configuration may effectively boost the signal from a source optical transmitter system/access point 215a, 215b and attenuate the interference from other transmitter systems/access points 215a, 215b, which may result in a better signal to noise performance. Moreover, the double-source cell configuration is easy to implement, since the signal from the 'Negative AP' 215b is simply an inverted version of the signal from the 'Positive AP' 215a.

The system is configured to process or combine the signals received by the receivers 115, 115' of the receiver system 105, 105', e.g. according to a signal combination scheme. For example, the system can be configured to process or combine the signals received by the receivers 115, 115' of the receiver system 105, 105' according to an equal gain combining (EGC) scheme, a select best combining (SBC) scheme, a maximum ratio combining (MRC) scheme, an optimum combining (OPC) scheme and/or the like.

In the SBC scheme, the system is configured to select one receiver 115, 115' of a receiver system 105, 105' (such as receiver systems of FIGS. 7 to 10) to establish a link with a transmitter system or access point 215, 215a, 215b, determine the signal to noise ratio achieved by at least one or each receiver 115, 115' in at least one or each of the receiver systems 105, 105' and select only the signal from the receiver achieving or having the highest signal to noise ratio. The received signal to noise ratio can be expressed as:

$$\gamma(b,k) = \frac{(rP_{tx}\Delta H_{(b,s_k)})^2}{N_0 B + \Sigma_{b' \neq b}(rP_{tx}\Delta H_{(b',s_k)})^2},$$

where r is the optical-to-electric conversion efficiency, $\Delta H_{(b,\,sk)}$ is the channel attenuation between the selected receiver $s_k$ and the source transmitter b; $N_0$ is the additive white Gaussian noise (AWGN) power spectral density and B is the communication bandwidth.

Since the receiver 115, 115' with the highest signal to noise ratio is used, the receiver system 105, 105' can achieve a high overall signal to noise ratio.

In the EGC scheme, the signals from each receiver 115, 115' in a receiver system 105, 105' (such as the receiver systems 105, 105' of FIGS. 7 to 10) are combined with equal weight. In the EGC scheme, the signal to noise ratio γ(b,k) can be calculated as:

$$\gamma(b,k) = \frac{\left(\sum_{s_k=1}^{M} rP_{tx}\Delta H_{(b,s_k)}\right)^2}{MN_0B + \sum_{s_k=1}^{M} \Sigma_{b'\neq b}(rP_{tx}\Delta H_{(b',s_k)})^2},$$

where the total number of receivers 115, 115' at a given receiver system 105, 105' is M.

This scheme only requires a simple adder for the combining circuit. Since the signal from multiple receivers 115, 115' is added up, the received signal power can be higher than for the SBC scheme. However, since each signal is equally weighted, in some scenarios, interference may not be suppressed, which could result in a poor overall signal to noise ratio.

The MRC scheme is similar to the EGC scheme except that the weight of each receiver 115, 115' is proportional to the signal to noise it achieves on a given link. In the MRC scheme, the received signal to noise ratio can be expressed as:

$$\gamma(b,k) = \frac{\left(\sum_{s_k=1}^{S} rP_{tx}w_{(b,s_k)}\Delta H_{(b,s_k)}\right)^2}{\sum_{s_k=1}^{S}\left(w_{(b,s_k)}^2 N_0B + \Sigma_{b'\neq b}(rP_{tx}w_{(b,s_k)}\Delta H_{(b',s_k)})^2\right)}.$$

Where $w_{(b,sk)}$ is the weighting factor of the receiver $s_k$ applied to the signal received from the source optical cell b. The weighting factor can be calculated as:

$$w_{(b,s_k)} = \frac{(rP_{tx}\Delta H_{(b,s_k)})^2}{N_0B + \Sigma_{b'\neq b}(rP_{tx}\Delta H_{(b',s_k)})^2}$$

Since the weight factors are proportional to the signal to noise ratio that each receiver 115, 115' achieves on a given link, a suitable circuit is needed to continuously monitor the signal to noise ratio achieved by each receiver 115, 115'. In addition, a multiplier and adder are necessary for combining the signals. However, the MRC scheme boosts the signal component and reduces noise components, resulting in a high overall signal to noise ratio.

The OPC scheme mitigates inter-cell interference by taking into account the channel's interference-plus-noise matrix. In the OPC scheme, the weights are calculated as:

$$w_b = aR_{nn}^{-1}u_{src}^b,$$

where $u_{src}^b = [rP_{tx}\Delta H_{(b,1)}, rP_{tx}\Delta H_{(b,2)}, \ldots, rP_{tx}\Delta H_{(b,S)}]^T$ is the set of signals received from the source transmitter b, a is a constant, $w_b = [w_{(b,1)}, w_{(b,2)}, \ldots, w_{(b,S)}]^T$ is a vector that contains the different weight factors, and the interference-plus-noise-correlation matrix is given by:

$$R_{nn} = N_0BI + \sum_{b' \in B_{inter}}[u_{b'}u_{b'}^T]$$

where $B_{inter}$ is a set of interference optical cells; I is the identity matrix and $u_{b'}$ is the set of interference signals:

$$u_{b'} = [rP_{tx}\Delta H_{(b',1)}, rP_{tx}\Delta H_{(b',2)}, \ldots, rP_{tx}\Delta H_{(b',S)}]^T$$

Compared with the MRC scheme, the OPC scheme not only needs a circuit to continuously monitor the signal to noise ratio for each receiver 115, 115', but also requires a circuit to calculate the weights according to the interference correlation between each receiver 115, 115'. However, by exploiting the interference correlation between each receiver 115, 115', the OPC scheme can suppress the correlated interference. This technique may achieve a higher signal to noise ratio performance compared with the MRC scheme.

Figure 16:
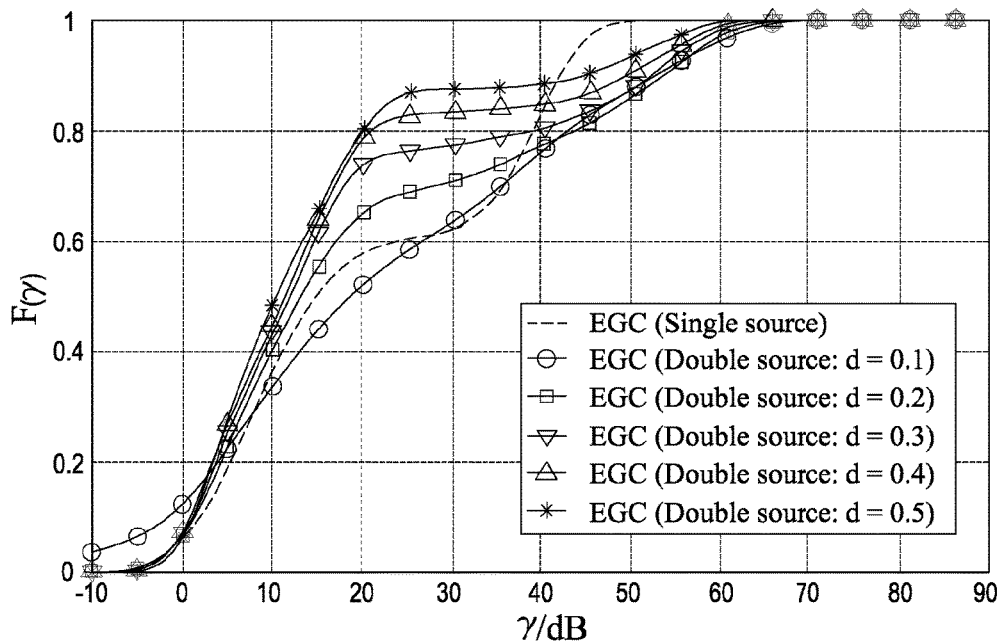
FIG. 16 is a plot of a cumulative distribution function of the signal to noise ratio against signal to noise ratio achieved by processing the signals received at a receiver system in the communications system of FIG. 13 using the EGC scheme for various access point separations.

FIG. 16 shows a graph of cumulative distribution function of the signal to noise ratio against signal to noise ratio achieved by processing the signals received at a receiver system in the communications system of FIG. 13 using the EGC scheme for various transmitter system/access point 215a, 215b separations. The plot was determined using simulation data for a standard exemplary arrangement of optical communications system based on that shown in FIG. 13, with the results from a single transmitter system/access point 215 per cell 210 system 205, such as that shown in FIG. 12, provided for comparison.

It can be seen from this that, for the EGC scheme, the arrangement of FIG. 13 out performs that of FIG. 12 when the separation d between transmitter system/access points 215a, 215b is low, e.g. less than 0.2 m, such as equal to 0.1 m but degrades for higher separations, e.g. for 0.2 m and above. Without wishing to be bound by theory, it is believed that this degradation may be due to interference from neighbouring cells as the distance between the access points 215a, 215b and neighbouring cells decreases.

Figure 17:
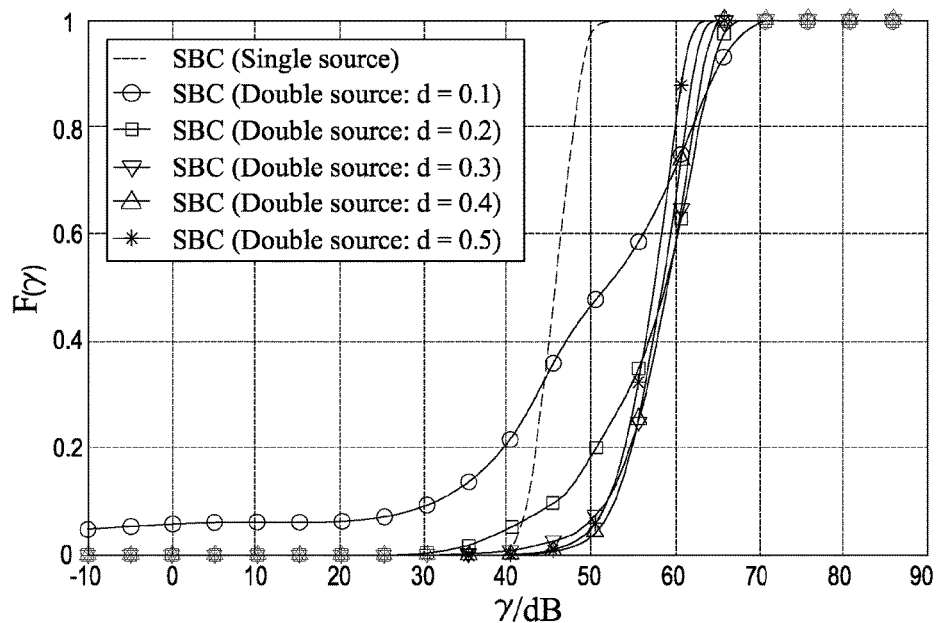
FIG. 17 is a plot of cumulative distribution function of the signal to noise ratio against signal to noise ratio achieved by processing the signals received at a receiver system in the communications system of FIG. 13 using the SBC scheme for various access point separations.

However, for the SBC scheme, as shown in FIG. 17, when d is small, the signal to noise ratio may be worse than for larger separations. Without wishing to be bound by theory, it is believed that this may be because only the activated receiver 115, 115' may establish line of sight links with both access points 215a, 215b, resulting in a small channel difference ΔH and thereby lower received optical power and thus signal to noise ratio.

Figure 18:
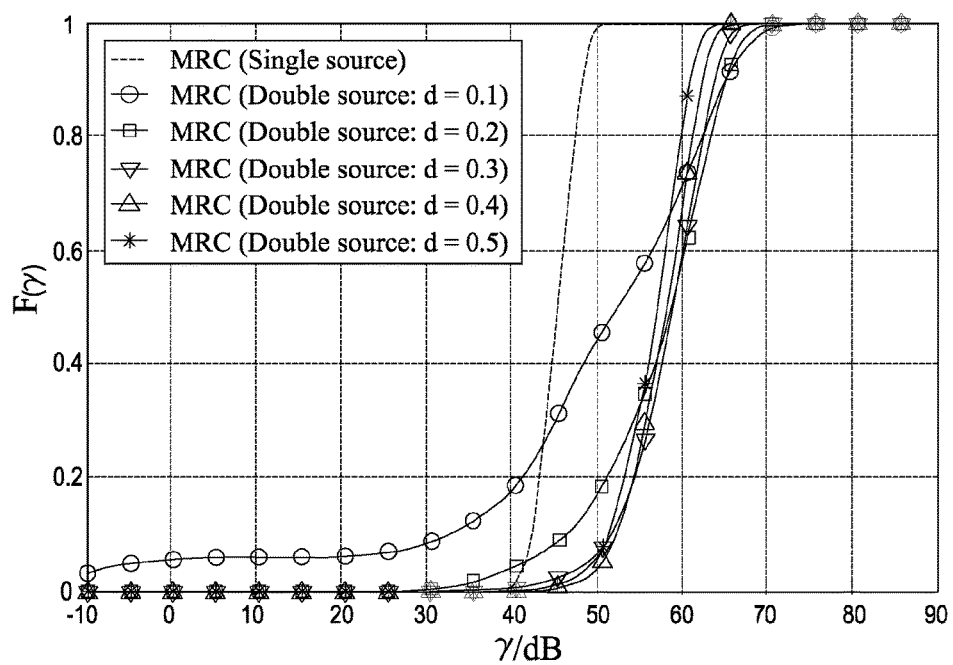
FIG. 18 is a plot of cumulative distribution function of the signal to noise ratio against signal to noise ratio achieved by processing the signals received at a receiver system in the communications system of FIG. 13 using the MRC scheme for various access point separations.

As can be seen from FIG. 18, the behaviour of the MRC scheme is similar to that of the SBC scheme.

Figure 19:
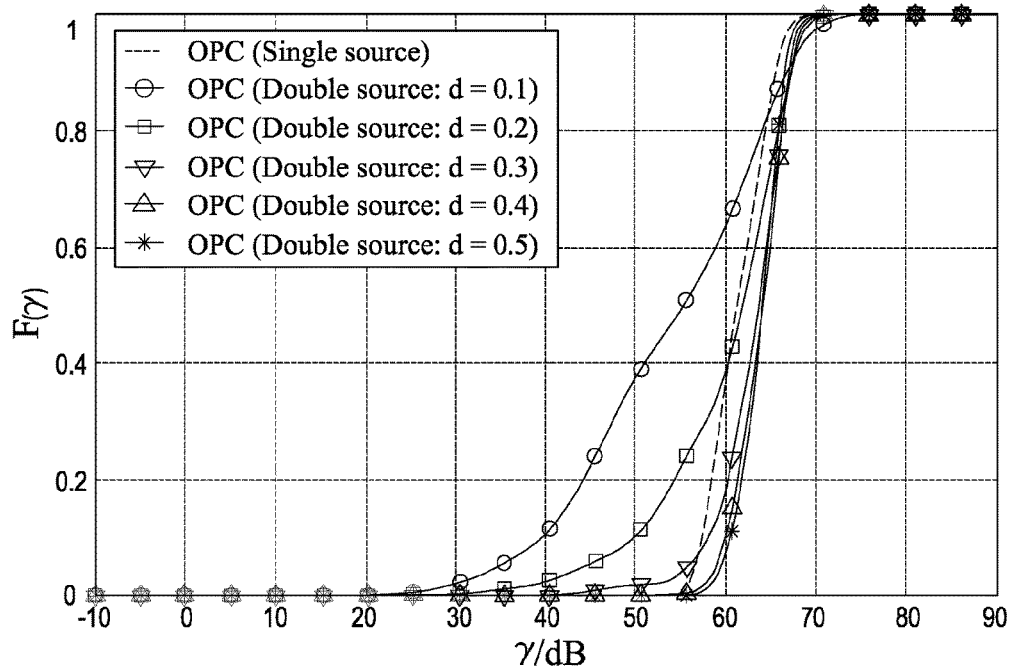
FIG. 19 is a plot of cumulative distribution function of the signal to noise ratio against signal to noise ratio achieved by processing the signals received at a receiver system in the communications system of FIG. 13 using the OPC scheme for various access point separations.

As can be seen from FIG. 19, it can also be seen that the performance of the OPC scheme is also better for larger separations (e.g. greater than 0.1 m), which may be for similar reasons to those given above in relation to the MRC and SBC schemes.

Figure 20:
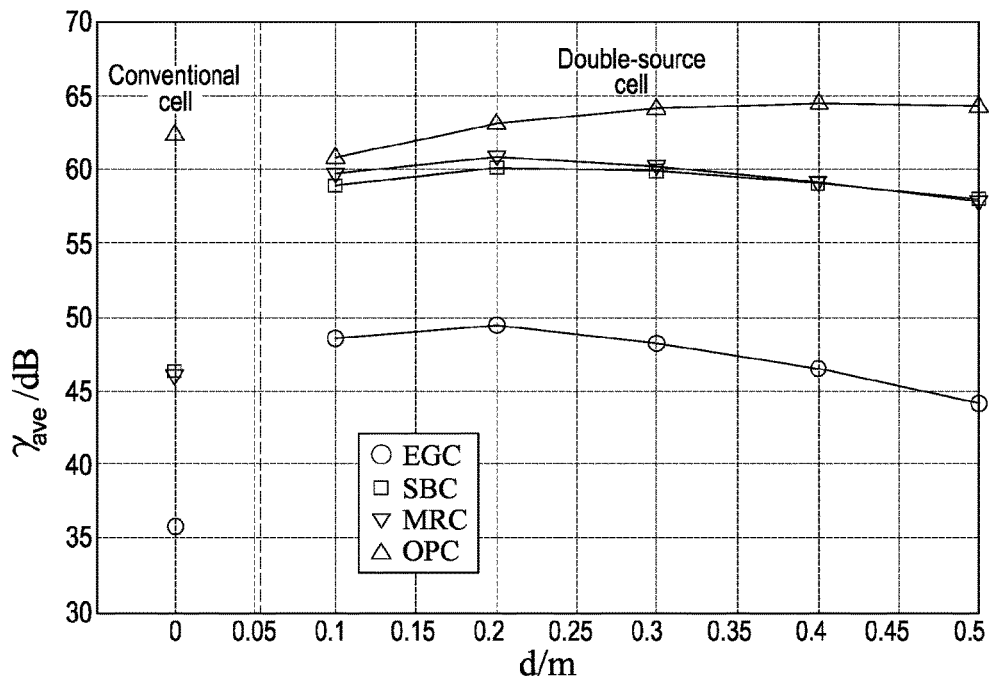
FIG. 20 is a plot of average achieved signal to noise ratio against access point separation in the communications system of FIG. 13 when processing the received signals using the EGC, SBC, MRC and OPC schemes.

FIG. 20 shows average achieved signal to noise ratio against access point 215a, 215b separation d in the communications system of FIG. 13 when processing the received signals using the EGC, SBC, MRC and OPC schemes. It can be seen from this that for the EGC, SBC and MRC schemes, signal to noise ratio peaks at access point 215a, 215b separations d of around 0.2 m For the OPC scheme, the optimal separation is slightly higher, at around 0.4 m.

However, it will be appreciated that the above figures are for an exemplary arrangement and that the optimum values could vary with parameters such as cell size, vertical distance from the transmitters 215a, 215b to the receivers 115, 115' and/or the like.

In any event, it can be seen that the signal to noise ratio achievable using the destructively interfering access point pairs 215a, 215b in each cell 210', as shown in FIG. 13, is higher than that achieved in the arrangement of FIG. 12 having only a single access point 215 per cell 210.

It will be appreciated that any of the embodiments described above could be used in a multiple-input multiple-output (MIMO) system. It will be appreciated that any suitable arrangement that imparts a usable angular relationship between the transmitters and receivers could be used in the MIMO system.

For example, in an embodiment, at least one or each of the transmitters itself could be or comprise an array of transmitter elements, wherein the transmitter elements form the elements of the MIMO array. At least one or each such transmitter, which comprises the array of transmitter elements, functions as a multiple output array or source for the MIMO system. The at least one or each individual transmitter (i.e. comprising the array of transmitter elements) at least partially provides the angular dependence, angularly dependent property, angularly dependent response and/or has a distinct angularly dependent arrangement or relationship with the at least one receiver. In other words at least one or each transmitter itself functions as a MIMO array, wherein the transmitter elements are the elements of the MIMO array.

In another embodiment, at least one or each of the transmitters comprise a plurality of groups, each group comprising one or more, e.g. a plurality of, transmitter elements, the transmitter elements being the elements of the MIMO array. The groups are arranged such that the plurality of groups as a whole may at least partially provides the angular dependence, angularly dependent property, angularly dependent response and/or have a distinct angularly dependent arrangement or relationship with the at least one receiver.

In another embodiment, a plurality of the transmitters is provided in a MIMO array. In other words, individual transmitters function as the elements of the MIMO array.

Other arrangements that provide a suitable MIMO system may be apparent to a person skilled in the art from the teaching of the present application.

It will be appreciated that specific embodiments having a certain number and orientation of transmitters and receivers are described. However, it will be appreciated that other numbers and/or orientations and/or transmitter or receiver types could be used.

In view of the above, it should be understood that the specific embodiments described herein are merely exemplary and that various modifications may be made thereto without departing from the scope of the invention, which is instead defined by the claims.

The invention claimed is:

1. An optical communications system comprising a plurality of optical transmitters for transmitting one or more signals and at least one optical receiver for receiving the one or more signals, wherein:
at least one of the optical transmitters or the optical receivers have an angular dependence, such that at least one of: at least one response of the receivers to a received signal or at least one property of the signals transmitted by the transmitters is angularly dependent;
at least one of the optical receiver and the optical transmitter or the signals transmitted by the transmitters of two or more transmitter-receiver pairs have a distinct associated angular arrangement or relationship, wherein at least one of: the angularly dependent response or the angularly dependent property of the signal is dependent on the angular arrangement or relationship; and
the system is configured to use at least one of: the angularly dependent property or the angularly dependent response to identify or discriminate at least one of: the transmitter from which the signal was transmitted or at least one optical communication channel associated therewith,
wherein:
the system is or comprises a cellular system comprising a plurality of cells, each cell comprising or being associated with one or more pairs of transmitters; and
one of the transmitters of one or more of the cells or pair is spaced apart from one or more other transmitter in the respective cell or pair and configured to concurrently transmit a signal that interferes destructively with the signal transmitted by the at least one or more other transmitter of the respective cell or pair.

2. An optical communications system according to claim 1, wherein at least one of:
at least one of the angularly dependent response or the angularly dependent property comprises at least one of power or intensity; and
the system is configured to determine at least one of: the angularly dependent property, the angularly dependent response, or a variation in at least one of: the angularly dependent property and the angularly dependent response.

3. An optical communications system according to claim 1, wherein at least one of: the at least one receiver has an associated optimal receiving axis or at least one of the transmitters or signals has an associated transmission axis.

4. An optical communications system according to claim 3, wherein the distinct angular arrangement or relationship comprises a unique or distinct angle at which the receiver is oriented or located relative to the transmission axis of the signal or transmitter.

5. An optical communications system according to claim 3, wherein the system comprises at least two transmitted signals, and the distinct angular arrangement or relationship comprises a relative angle between signal transmission axes at the at least one receiver.

6. An optical communications system according to claim 3, wherein the distinct angular arrangement or relationship comprises a distinct or unique angle between a path or axis along which signals from the transmitters are received at the uat least one receiver and an optimum receiving axis of the at least one receiver.

7. An optical communications system according to claim 1, wherein the system comprises at least two transmitters or signals, and at least one transmitter or signal is angled or oriented differently or obliquely to at least one other transmitter or signal.

8. An optical communications system according to claim 1, wherein the system comprises at least two receivers, and at least one receiver is angled or oriented differently or obliquely to at least one other receiver.

9. An optical communications system according to claim 1, wherein the relative angular orientation of at least one of the transmitters or signal relative to the angular orientation of at least one receiver is different from the angular orientation of at least one other of the transmitters or signal relative to the angular orientation of the at least one receiver.

10. An optical communications system according to claim 1, wherein the system is configured to use at least one of: the orientation or angle of the transmitters or a signal transmitted therefrom, the at least one receiver, or the relative orientations of the transmitters or signal transmitted therefrom and at least one receiver to at least one of: distinguish between transmitters or optical communications channels, or to encode or decode data.

11. An optical communications system according to claim 1, wherein the angular arrangement or relationship of at least one transmitter-receiver pair is known or predetermined.

12. An optical communications system according to claim 1, wherein the effect on at least one of: the response of the at least one receiver or property of the signal due to the angular arrangement or relationship of at least one transmitter-receiver pair is provided as reference data.

13. An optical communications system according to claim 12, wherein the reference data is generated by calibration or calculation.

14. An optical communications system according to claim 13, wherein the reference data is recalculated in real time.

15. An optical communications system according to claim 1, wherein the communications system is or comprises a visible light communication (VLC) system.

16. An optical communications system according to claim 1, wherein the transmitters comprise at least one of: an LED, an OLED, a laser, or a laser.

17. An optical communications system according to claim 1, wherein the at least one receiver comprises a light detector element.

18. An optical communications system according to claim 1, wherein the communications system comprises a transmitter array and the transmitters are comprised in in the transmitter array, and wherein the transmitter array is or comprises a one, two or three dimensional array.

19. An optical communications system according to claim 1, wherein the communications system comprises a receiver array and the at least one receiver is comprised in the receiver array, and wherein the receiver array is or comprises a one, two or three dimensional array.

20. An optical communications system according to claim 18, wherein at least one of: the array of transmitters or an array of a plurality of the receivers is or comprises at least one of: a shaped array or a curved array.

21. An optical communications system according to claim 20, wherein the shaped array comprises one of: a convex array or a concave array.

22. An optical communications system according to claim 1, wherein at least one of: the transmitters or the at least one receiver is provided with an optical system for modifying the angle or orientation of at least one signal path or axis.

23. An optical communications system according to claim 22, wherein the optical system comprises one or more optical components or portions of optical components.

24. An optical communications system according to claim 22, wherein the optical system is configured to modify the beam or signal path of a beam emitted from one or more of the transmitters, such that the angle of the signal path or a beam path received by the at least one receiver from one or more of the transmitters is different to the angle at which the signal or beam path from one or more of the transmitters is received by at one or more other receivers.

25. An optical communications system according to claim 1, wherein the communications system is or comprises a multiple-input multiple-output (MIMO) system.

26. An optical communications system according to claim 1, wherein at least one receiver comprises a limited or narrow field of view.

27. An optical communications system according to claim 1, wherein the system is configured to activate or address selected receivers for receiving signals during communications, wherein the selectively activated or addressed receivers are those receivers for which a signal from at least one of the transmitters is received or the strongest or having the best signal to noise ratio or lowest interference or highest distinction between transmitters.

28. An optical communications system according to claim 1, wherein at least one of: the angle or orientation of at least one of the transmitters or the beam axis of the signals or beams emitted thereby is at least one of variable or adjustable.

29. An optical communications system according to claim 1, configured to transmit using orthogonal frequency division multiplexing (OFDM).

30. An optical communications system according to claim 1, wherein the at least one receiver of at least one of the cells is angled with respect to at least one other receiver of the respective cell by an angle that is the same as or greater than a field of view angle or half angle of at least one or each of the receivers.

31. An optical communications system according to claim 1, wherein at least one of the transmitters of at least one of the cells is configured to concurrently transmit at least one of: the same information or the same signal as at least one other transmitter of the respective cell.

32. An optical communications system according to claim 1, wherein the at least one of the transmitters of the at least one of the cells is configured to concurrently transmit a signal that is the opposite polarity or sign or is the inverse of the signal transmitted by the at least one other transmitter of the respective cell.

33. An optical communications system according to claim 1, wherein the system is configured to combine the signals received by a plurality of the receivers according to a signal combination scheme.

34. An optical communications system according to claim 33, wherein the system is configured to combine the signals received by the plurality of receivers according to at least one of: an equal gain combining (EGC) scheme, a select best combining (SBC) scheme, a maximum ratio combining (MRC) scheme, or an optimum combining (OPC) scheme.

35. An optical transmission system comprising a plurality of optical transmitters for transmitting optical signals, wherein
 the transmitters have an angular dependence, such that at least one property of the signals emitted by the transmitters is angularly dependent;
 at least one of the transmitters or the signal transmitted therefrom has an angular arrangement that is different to the angular arrangement of at least one other of the transmitters or the signal transmitted therefrom; and
 the angularly dependent property is usable to identify or discriminate at least one of: the transmitter from which the signal was transmitted and at least one optical communication channel associated therewith,
 wherein:
  the transmission system is configured for use in a cellular transmission system comprising a plurality of cells, each cell comprising or being associated with one or more pairs of transmitters; and
  one of the transmitters of one or more of the cells or pair is spaced apart from one or more other transmitter in the respective cell or pair and configured to concurrently transmit a signal that interferes destructively with the signal transmitted by at least one or more other transmitter of the respective cell or pair.

36. An optical transmission system according to claim 35, wherein at least one of the transmitterus is configured such that a beam path of the signal transmitted by the at least one transmitter is at least one of angled or oblique to the beam path of the signal transmitted by at least one other of the transmitters.

37. An optical transmission system according to claim 35, wherein at least one of the transmitters is angled relative to at least one other of the transmitters.

38. An optical transmission system according to claim 35, wherein the transmission system is configured such that at least one of the transmitters is associated with at least one of: a predetermined angle or orientation of the at least one transmitter or a signal produced thereby or a relative angular orientation of the at least one transmitter or signal relative to one or more receivers.

39. An optical transmission system according to claim 35, wherein the angular arrangement or relationship of at least one beam path of the signal is calibrated or calculated relative to one or more receivers in use or in real-time.

40. An optical transmission system according to claim 35, wherein the transmission system is configured to encode a signal by selection of at least one of the transmitters to use to transmit a signal.

41. An optical transmission system according to claim 35, wherein the transmission system comprises an optical system.

42. An optical transmission system according to claim 41, wherein the optical system is configured to modify at least one of: a direction or an angle of a beam path of the signal emitted by at least one of the transmitters differently to the beam path of a signal emitted by at least one other of the transmitters.

43. An optical transmission system according to claim 41, wherein the optical system is configured to modify at least one of: a direction or an angle of beam paths of the signals transmitted by at least one of the transmitters such that the beam path of the signal received at one or more receivers from the at least one of the transmitters is distinct to the beam path of the signal received at the one or more receivers from at least one other of the transmitters.

44. An optical transmission system according to claim 35, wherein the transmitter comprise or are comprised in an array of transmitters.

45. An optical transmission system according to claim 44, wherein the array is or comprises at least one of: a shaped array or a curved array.

46. An optical transmission system according to claim 35, wherein the transmitters comprise a light source comprising at least one: an LED, an OLED, a laser, or a laser diode.

47. An optical receiver system comprising a plurality of optical receivers for receiving optical signals, wherein
at least one response of one or more of the receivers is angularly dependent; the angular arrangement of at least one receiver or signals received thereby is different to the angular arrangement of at least one other receiver or signals received thereby; and
the angularly dependent response is used or usable to identify at least one of: a transmitter from which the signal was transmitted or at least one optical communication channel associated therewith,
wherein:
the receiver system is configured for use in a cellular transmission system comprising a plurality of cells, each cell comprising or being associated with one or more pairs of transmitters; and
one of the transmitters of one or more of the cells or pair is spaced apart from one or more other transmitter in the respective cell or pair and configured to concurrently transmit a signal that interferes destructively with the signal transmitted by the at least one or more other transmitter of the respective cell or pair.

48. An optical receiver system according to claim 47, wherein at least one of the receivers is arranged to receive a signal from at least one of the transmitters at a different angle to a signal from at least one other of the transmitters.

49. An optical receiver system according to claim 47, wherein the receiver system is configured to determine or discriminate at least one of: a transmitter or an associated optical communications channel or to decode a signal, based on the angularly dependent response of at least one of the receivers.

50. An optical receiver system according to claim 47, wherein at least one of the receivers is at least one of: angled or oblique to at least one other of the receivers.

51. An optical receiver system according to claim 47, wherein the response generated by at least one of the receivers for a given received signal varies depending on the angle at which the signal was received.

52. An optical receiver system according to claim 47, wherein an optimal receiving axis of at least one of the receivers is at least one of: angled or oblique to the optimal receiving axis of at least one other of the receivers, and wherein the optimal receiving axis for at least one of the receivers is a signal or beam axis or path for which the response generated by the at least one of the receivers for a given signal is the highest.

53. An optical receiver system according to claim 47, wherein the receiver system comprises an optical system.

54. An optical receiver system according to claim 53, wherein the optical system is configured to modify at least one of: a direction or angle of a beam path or axis of a signal from at least one of the transmitters such that the signal is received by at least one of the receivers at a different angle to the angle at which a signal from at least one other of the transmitters is received by the respective at least one of the receivers.

55. An optical receiver system according to claim 47, wherein the receiver comprises or is comprised in an arrays.

56. An optical receiver system according to claim 55, wherein the array is or comprises at least one of: a shaped array or a curved array.

57. A method for transmitting an optical signal using an optical communications system comprising a plurality of optical transmitters for transmitting one or more optical signals and at least one optical receiver for receiving the one or more optical signals, wherein:
at least one of: the transmitters and the at least one receiver have an angular dependence, such that at least one of: at least one response of the receivers to a received signal and at least one property of the signals transmitted by the transmitters is angularly dependent;
the system is or comprises a cellular system comprising a plurality of cells, each cell comprising or being associated with one or more pairs of transmitters; and
one of the transmitters of one or more of the cells or pair is spaced apart from one or more other transmitter in the respective cell or pair,
the method comprising:
using at least one of: the angularly dependent property or the angularly dependent response to identify at least one: the transmitter from which the signal was transmitted, the transmitter-receiver pair, or at least one optical communication channel associated therewith, and using the one or more transmitters of one or more of the cells or pair to concurrently transmit a signal that interferes destructively with the signal transmitted by at least one or more other transmitter of the respective cell or pair.

58. A method according to claim 57, wherein the method further comprises providing a beam path of the signal of at least one of the transmitters at at least one of: an angle or obliquely to a beam path of at least one other of the transmitters.

59. A method according to claim 57, wherein the method further comprises at least one: encoding a signal or identifying or discriminating a transmitter or an associated optical communications channel by at least one of: associating one or more transmitters or signals transmitted thereby with at least one of: a predetermined angle, orientation or relative angular orientation relative to one or more receivers.

60. A method of receiving an optical signal using an optical communications system comprising a plurality of optical transmitters for transmitting one or more optical signals and at least one optical receiver for receiving the one or more optical signals, wherein:
   at least one of: the transmitters and the at least one receiver have an angular dependence, such that at least one of: at least one response of the receivers to a received signal and at least one property of the signals transmitted by the transmitters is angularly dependent;
   the system is or comprises a cellular system comprising a plurality of cells, each cell comprising or being associated with one or more pairs of transmitters; and
   one of the transmitters of one or more of the cells or pair is spaced apart from one or more other transmitter in the respective cell or pair,
wherein the method comprises:
   using at least one of: the angularly dependent property or the angularly dependent response to identify at least one of: the transmitter from which the signal was transmitted or the transmitter-receiver pair or at least one optical communication channel associated therewith; and
   using the one or more transmitters of one or more of the cells or pair to concurrently transmit a signal that interferes destructively with the signal transmitted by at least one or more other transmitter of the respective cell or pair.

61. A method according to claim 60, wherein the method comprises determining at least one of: an angle at which a signal is received at one or more of the receivers, or at least one property indicative thereof.

62. A method according to claim 60, wherein the method comprises at least one of: identifying at least one of: a transmitter from which the signal was transmitted, or an optical communications channel associated therewith, based on an angle at which a signal is received, or identifying at least one of: at least one response of the receiver indicative thereof, or a relative angle between a transmitter and a given receiver, or at least one response of the receiver indicative thereof.

* * * * *